(12) United States Patent  
Pepe et al.

(10) Patent No.: US 9,203,198 B2
(45) Date of Patent: Dec. 1, 2015

(54) LOW PROFILE FACEPLATE HAVING MANAGED CONNECTIVITY

(71) Applicants: Tyco Electronics Corporation, Berwyn, PA (US); ADC Telecommunications, Inc., Berwyn, PA (US)

(72) Inventors: Paul John Pepe, Clemmons, NC (US); Joseph C. Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 155 days.

(21) Appl. No.: 14/033,970

(22) Filed: Sep. 23, 2013

(65) Prior Publication Data

US 2014/0094059 A1 Apr. 3, 2014

Related U.S. Application Data

(60) Provisional application No. 61/707,242, filed on Sep. 28, 2012.

(51) Int. Cl.
*H01R 13/66* (2006.01)
*H01R 31/06* (2006.01)
*H01R 43/20* (2006.01)
(Continued)

(52) U.S. Cl.
CPC ............ *H01R 31/06* (2013.01); *H01R 13/6658* (2013.01); *H01R 25/006* (2013.01); *H01R 43/205* (2013.01); *H01R 24/64* (2013.01); *Y10T 29/49128* (2015.01)

(58) Field of Classification Search
CPC .. H01R 31/06; H01R 43/205; H01R 13/6658; H01R 24/64; H01R 25/006; Y10T 29/49128
USPC ............................. 439/535, 536, 540.1, 676
See application file for complete search history.

(56) References Cited

U.S. PATENT DOCUMENTS

| 3,243,761 A | 3/1966 | Piorunneck |
| 4,127,317 A | 11/1978 | Tyree |
| 4,953,194 A | 8/1990 | Hansen et al. |

(Continued)

FOREIGN PATENT DOCUMENTS

| CA | 2499803 | 4/2004 |
| DE | 102 44 304 | 3/2004 |

(Continued)

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.

(Continued)

*Primary Examiner* — Khiem Nguyen
(74) *Attorney, Agent, or Firm* — Merchant & Gould P.C.

(57) ABSTRACT

A faceplate assembly includes a faceplate member; at least one jack module mounted in an opening of the faceplate member; and a printed circuit board assembly. The printed circuit board assembly includes a printed circuit board; a first set of secondary contacts that are electrically connected to the printed circuit board; and a network connector that is electrically connected to the secondary contacts of the first set via the printed circuit board. The secondary contacts extend into the jack module. The secondary contacts are isolated from primary contacts of the jack module.

10 Claims, 20 Drawing Sheets

(51) Int. Cl.
*H01R 25/00* (2006.01)
*H01R 24/64* (2011.01)

(56) References Cited

U.S. PATENT DOCUMENTS

| | | | |
|---|---|---|---|
| 4,968,929 A | 11/1990 | Hauck et al. |
| 5,030,123 A | 7/1991 | Silver |
| 5,052,940 A | 10/1991 | Bengal |
| 5,107,532 A | 4/1992 | Hansen et al. |
| 5,161,988 A | 11/1992 | Krupka |
| 5,166,970 A | 11/1992 | Ward |
| 5,197,895 A | 3/1993 | Stupecky |
| 5,222,164 A | 6/1993 | Bass, Sr. et al. |
| 5,265,187 A | 11/1993 | Morin et al. |
| 5,305,405 A | 4/1994 | Emmons et al. |
| 5,353,367 A | 10/1994 | Czosnowski et al. |
| 5,382,182 A | 1/1995 | Shen et al. |
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,415,570 A | 5/1995 | Sarkissian |
| 5,418,334 A | 5/1995 | Williams |
| 5,419,717 A | 5/1995 | Abendschein et al. |
| 5,448,675 A | 9/1995 | Leone et al. |
| 5,467,062 A | 11/1995 | Burroughs et al. |
| 5,470,251 A | 11/1995 | Sano |
| 5,473,715 A | 12/1995 | Schofield et al. |
| 5,483,467 A | 1/1996 | Krupka et al. |
| 5,660,567 A | 8/1997 | Nierlich et al. |
| 5,674,085 A | 10/1997 | Davis et al. |
| 5,685,741 A | 11/1997 | Dewey et al. |
| 5,704,797 A | 1/1998 | Meyerhoefer et al. |
| 5,712,942 A | 1/1998 | Jennings et al. |
| 5,800,192 A | 9/1998 | David et al. |
| 5,821,510 A | 10/1998 | Cahen et al. |
| 5,854,824 A | 12/1998 | Bengal et al. |
| 5,871,368 A | 2/1999 | Erdner et al. |
| 5,910,776 A | 6/1999 | Black |
| 6,002,331 A | 12/1999 | Laor |
| 6,095,837 A | 8/2000 | David et al. |
| 6,095,851 A | 8/2000 | Laity et al. |
| 6,116,961 A | 9/2000 | Henneberger et al. |
| 6,222,908 B1 | 4/2001 | Bartolutti et al. |
| 6,222,975 B1 | 4/2001 | Gilbert et al. |
| 6,227,911 B1 | 5/2001 | Boutros et al. |
| 6,234,830 B1 | 5/2001 | Ensz et al. |
| 6,238,235 B1 | 5/2001 | Shavit et al. |
| 6,244,908 B1 | 6/2001 | Hammond et al. |
| 6,280,231 B1 | 8/2001 | Nicholls |
| 6,285,293 B1 | 9/2001 | German et al. |
| 6,300,877 B1 | 10/2001 | Schannach et al. |
| 6,330,148 B1 | 12/2001 | Won et al. |
| 6,330,307 B1 | 12/2001 | Bloch et al. |
| 6,350,148 B1 | 2/2002 | Bartolutti et al. |
| 6,364,694 B1 | 4/2002 | Lien |
| 6,371,780 B1 | 4/2002 | Aponte et al. |
| 6,421,322 B1 | 7/2002 | Koziy et al. |
| 6,422,895 B1 | 7/2002 | Lien |
| 6,424,710 B1 | 7/2002 | Bartolutti et al. |
| 6,431,892 B1 | 8/2002 | Shupe et al. |
| 6,456,768 B1 | 9/2002 | Boncek et al. |
| D466,479 S | 12/2002 | Pein et al. |
| 6,499,861 B1 | 12/2002 | German et al. |
| 6,511,231 B2 | 1/2003 | Lampert et al. |
| 6,522,737 B1 | 2/2003 | Bartolutti et al. |
| 6,554,484 B2 | 4/2003 | Lampert |
| 6,574,586 B1 | 6/2003 | David et al. |
| 6,612,856 B1 | 9/2003 | McCormack |
| 6,626,697 B1 | 9/2003 | Martin et al. |
| 6,636,152 B2 | 10/2003 | Schannach et al. |
| 6,641,443 B1 | 11/2003 | Itano et al. |
| 6,663,436 B1 | 12/2003 | Arnett et al. |
| 6,684,179 B1 | 1/2004 | David |
| 6,725,177 B2 | 4/2004 | David et al. |
| 6,743,044 B2 | 6/2004 | Musolf et al. |
| 6,780,035 B2 | 8/2004 | Bohbot |
| 6,786,776 B2 | 9/2004 | Itano et al. |
| 6,793,408 B2 | 9/2004 | Levy et al. |
| 6,802,735 B2 | 10/2004 | Pepe et al. |
| 6,808,116 B1 | 10/2004 | Eslambolchi et al. |
| 6,811,446 B1 | 11/2004 | Chang |
| 6,814,624 B2 | 11/2004 | Clark et al. |
| 6,850,685 B2 | 2/2005 | Tinucci et al. |
| 6,898,368 B2 | 5/2005 | Colombo et al. |
| 6,905,363 B2 | 6/2005 | Musolf et al. |
| 6,932,517 B2 | 8/2005 | Swayze et al. |
| D510,068 S | 9/2005 | Haggay et al. |
| 6,939,168 B2 | 9/2005 | Oleynick et al. |
| 6,961,675 B2 | 11/2005 | David |
| 6,971,895 B2 | 12/2005 | Sago et al. |
| 6,976,867 B2 | 12/2005 | Navarro et al. |
| 7,077,710 B2 | 7/2006 | Haggay et al. |
| 7,081,808 B2 | 7/2006 | Colombo et al. |
| 7,112,090 B2 | 9/2006 | Caveney et al. |
| 7,123,810 B2 | 10/2006 | Parrish |
| 7,153,142 B2 | 12/2006 | Shifris et al. |
| 7,165,728 B2 | 1/2007 | Durrant et al. |
| 7,193,422 B2 | 3/2007 | Velleca et al. |
| 7,207,819 B2 | 4/2007 | Chen |
| 7,210,858 B2 | 5/2007 | Sago et al. |
| 7,226,217 B1 | 6/2007 | Benton et al. |
| 7,234,944 B2 | 6/2007 | Nordin et al. |
| 7,241,157 B2 | 7/2007 | Zhuang et al. |
| 7,297,018 B2 | 11/2007 | Caveney et al. |
| 7,312,715 B2 | 12/2007 | Shalts et al. |
| D559,186 S | 1/2008 | Kelmer |
| 7,314,392 B2 | 1/2008 | Pharn et al. |
| 7,314,393 B2 | 1/2008 | Hashim |
| 7,315,224 B2 | 1/2008 | Gurovich et al. |
| 7,352,289 B1 | 4/2008 | Harris |
| 7,370,106 B2 | 5/2008 | Caveney |
| 7,384,300 B1 | 6/2008 | Salgado et al. |
| 7,396,245 B2 | 7/2008 | Huang et al. |
| 7,479,032 B2 | 1/2009 | Hoath et al. |
| 7,497,709 B1 | 3/2009 | Zhang |
| 7,519,000 B2 | 4/2009 | Caveney et al. |
| 7,534,137 B2 | 5/2009 | Caveney et al. |
| 7,552,872 B2 | 6/2009 | Tokita et al. |
| 7,563,116 B2 | 7/2009 | Wang |
| 7,570,861 B2 | 8/2009 | Smrha et al. |
| 7,575,454 B1 | 8/2009 | Aoki et al. |
| 7,588,470 B2 | 9/2009 | Li et al. |
| 7,591,667 B2 | 9/2009 | Gatnau Navarro et al. |
| 7,607,926 B2 | 10/2009 | Wang |
| 7,635,280 B1 | 12/2009 | Crumlin et al. |
| 7,648,377 B2 | 1/2010 | Naito et al. |
| 7,682,174 B2 | 3/2010 | Chen |
| 7,722,370 B2 | 5/2010 | Chin |
| 7,727,026 B2 | 6/2010 | Qin et al. |
| 7,785,154 B2 | 8/2010 | Peng |
| 7,798,832 B2 | 9/2010 | Qin et al. |
| 7,811,119 B2 | 10/2010 | Caveney et al. |
| 7,814,240 B2 | 10/2010 | Salgado et al. |
| 7,867,017 B1 | 1/2011 | Chen |
| 7,869,426 B2 | 1/2011 | Hough et al. |
| 7,872,738 B2 | 1/2011 | Abbott |
| 7,880,475 B2 | 2/2011 | Crumlin et al. |
| 7,914,310 B2 | 3/2011 | Johansson et al. |
| 8,157,582 B2 | 4/2012 | Frey et al. |
| 8,282,425 B2 | 10/2012 | Bopp et al. |
| 8,287,316 B2 | 10/2012 | Pepe et al. |
| 8,408,926 B1 | 4/2013 | Chang |
| 8,480,438 B2 | 7/2013 | Mattson |
| 8,992,260 B2 * | 3/2015 | Coffey et al. ............ 439/620.22 |
| 8,992,261 B2 * | 3/2015 | Mattson ................... 439/620.23 |
| 9,054,440 B2 * | 6/2015 | Taylor et al. |
| 2002/0008613 A1 | 1/2002 | Nathan et al. |
| 2004/0052498 A1 | 3/2004 | Colombo et al. |
| 2004/0240807 A1 | 12/2004 | Frohlich et al. |
| 2006/0160395 A1 | 7/2006 | Macauley et al. |
| 2006/0234564 A1 | 10/2006 | Pham et al. |
| 2007/0237470 A1 | 10/2007 | Aronson et al. |
| 2007/0254529 A1 | 11/2007 | Pepe et al. |
| 2008/0090454 A1 | 4/2008 | Hoath et al. |

(56) References Cited

U.S. PATENT DOCUMENTS

| | | |
|---|---|---|
| 2008/0100467 A1 | 5/2008 | Downie et al. |
| 2009/0097846 A1 | 4/2009 | Kozischek et al. |
| 2009/0166404 A1 | 7/2009 | German et al. |
| 2009/0215310 A1 | 8/2009 | Hoath et al. |
| 2009/0232455 A1 | 9/2009 | Nhep |
| 2009/0311916 A1 | 12/2009 | Martich |
| 2010/0048064 A1 | 2/2010 | Peng |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2011/0115494 A1 | 5/2011 | Taylor et al. |
| 2011/0228473 A1 | 9/2011 | Anderson et al. |
| 2012/0003877 A1 | 1/2012 | Bareel et al. |
| 2012/0021636 A1 | 1/2012 | Debenedictis et al. |
| 2012/0184141 A1 | 7/2012 | Mattson |
| 2012/0322310 A1 | 12/2012 | Taylor |

FOREIGN PATENT DOCUMENTS

| | | |
|---|---|---|
| DE | 10 2004 033 940 A1 | 2/2006 |
| DE | 10 2008 034 261 A1 | 1/2010 |
| DE | 10 2008 052 857 A1 | 4/2010 |
| JP | 2004-281404 | 10/2004 |
| WO | WO 00/65696 | 11/2000 |
| WO | WO 02/47215 A1 | 6/2002 |
| WO | WO 2010/001400 A1 | 1/2010 |
| WO | WO 2010/081186 A1 | 7/2010 |
| WO | WO 2010/121639 A1 | 10/2010 |

OTHER PUBLICATIONS

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

*Intelligent patching systems carving out a 'large' niche*, Cabling Installation & Maintenance, vol. 12, Issue 7, Jul. 2004 (5 pages).

*intelliMAC: The intelligent way to make Moves, Adds or Changes!* NORDX/CDT © 2003 (6 pages).

International Search Report and Written Opinion for PCT/US2013/061629 mailed Jan. 28, 2014.

iTRACS Physical Layer Manager FAQ, obtained on Jun. 11, 2008 from http://www.itracs.com/products/physical-layer-manager-faqs.html (6 pages).

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

Ohtsuki, F. et al., "Design of Optical Connectors with ID Modules," *Electronics and Communications in Japan*, Part 1, vol. 77, No. 2, pp. 94-105 (Feb. 1994).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

TrueNet; TFP Series Rack Mount Fiber Panels, Spec Sheet; May 2008; 8 pages.

* cited by examiner

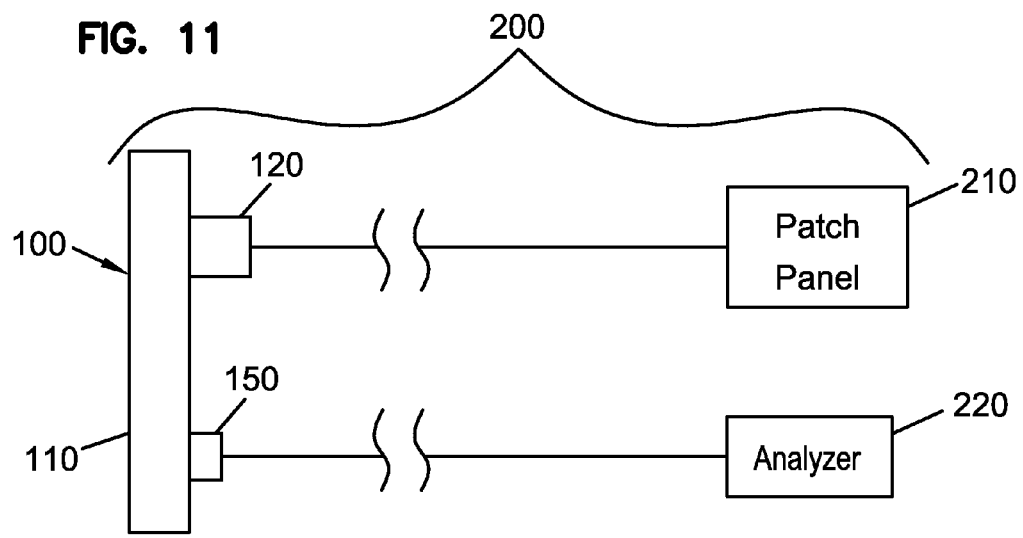
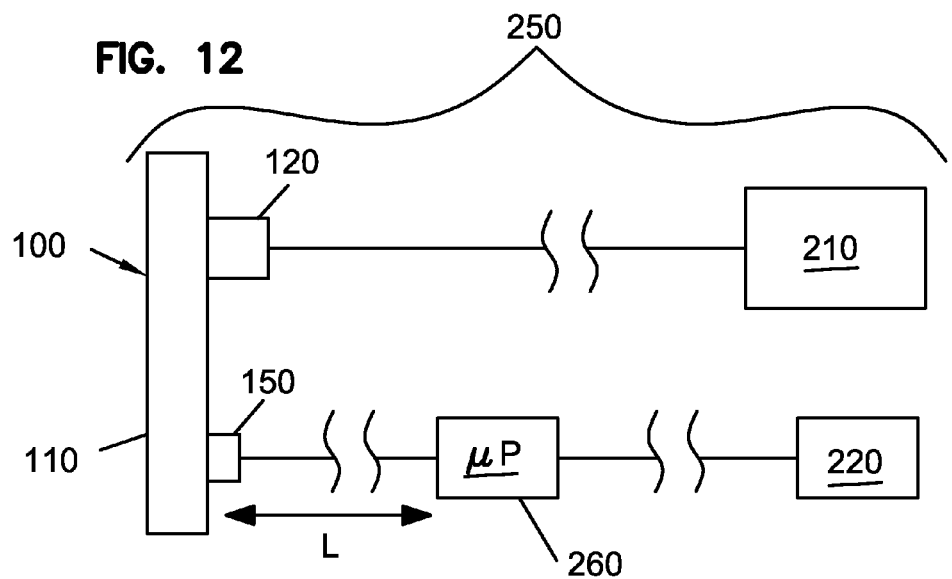

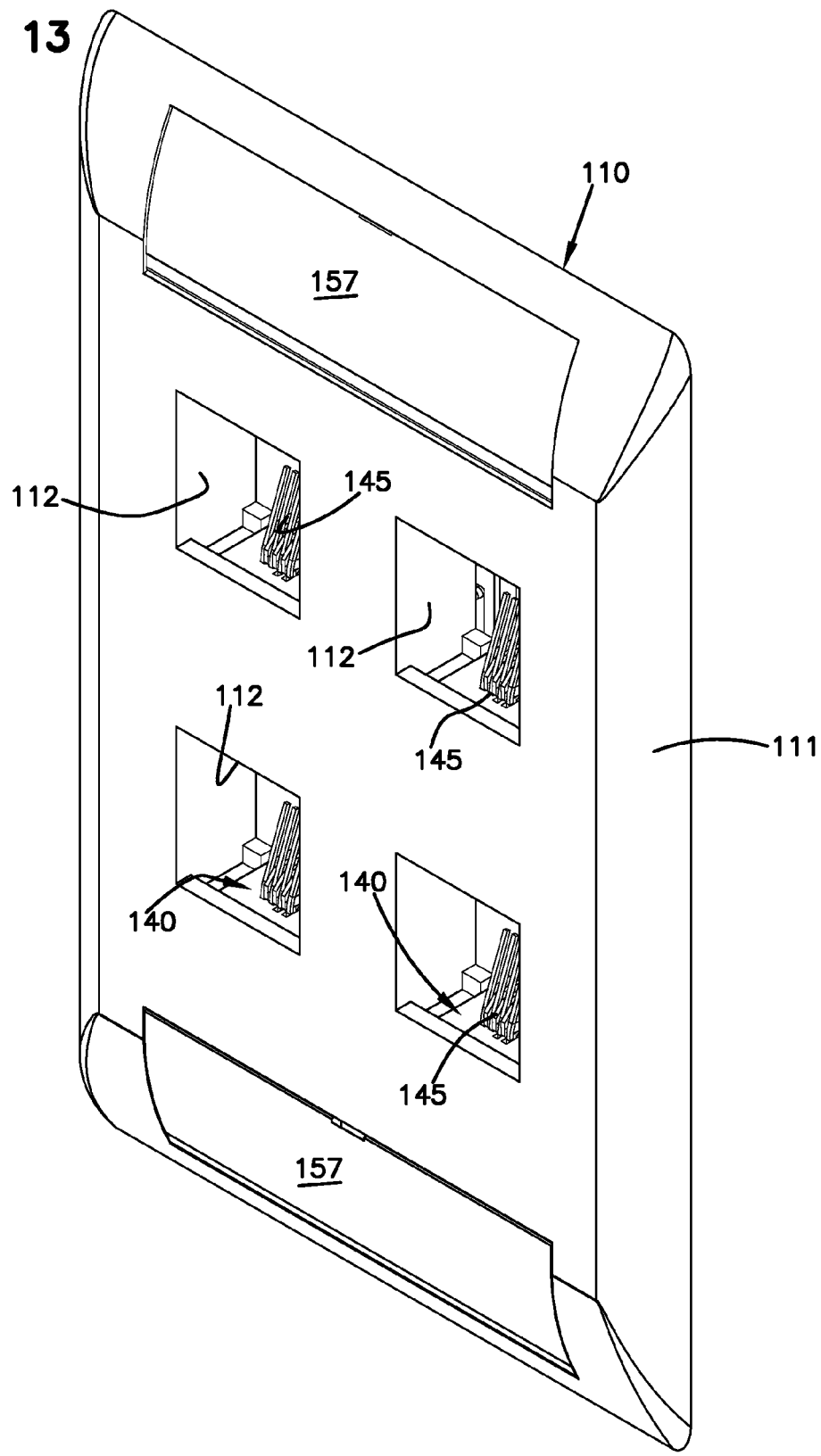

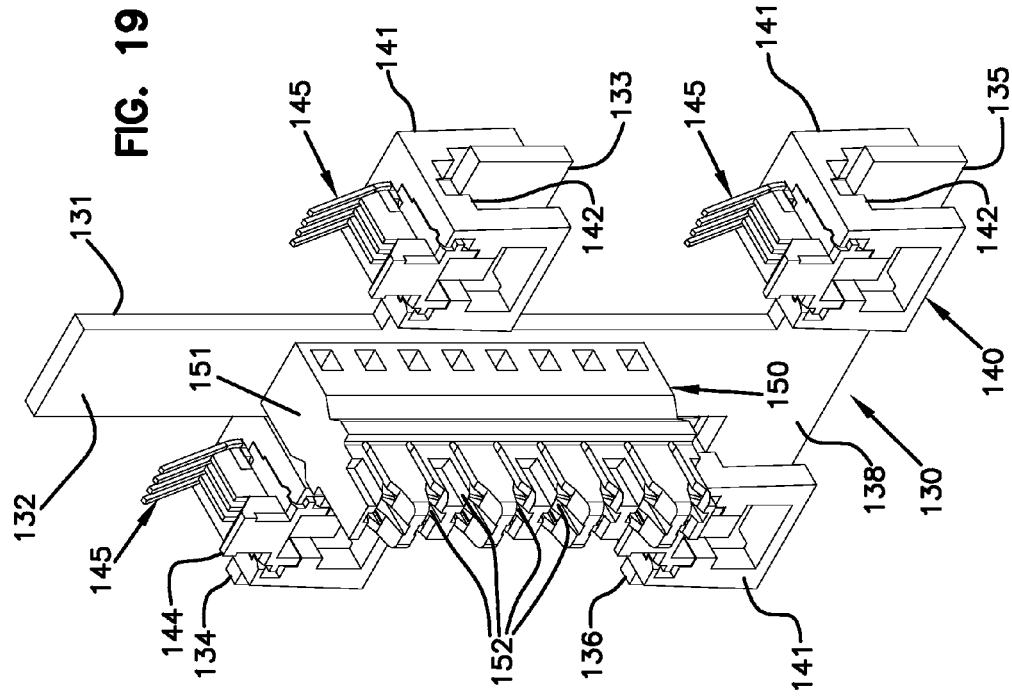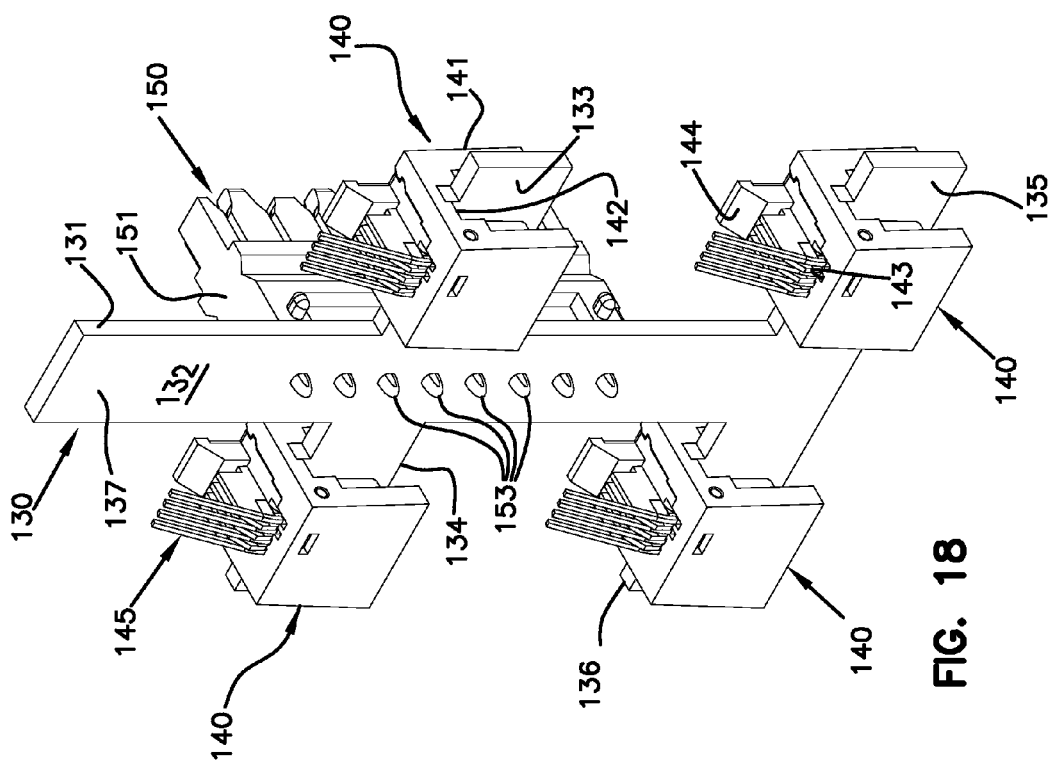

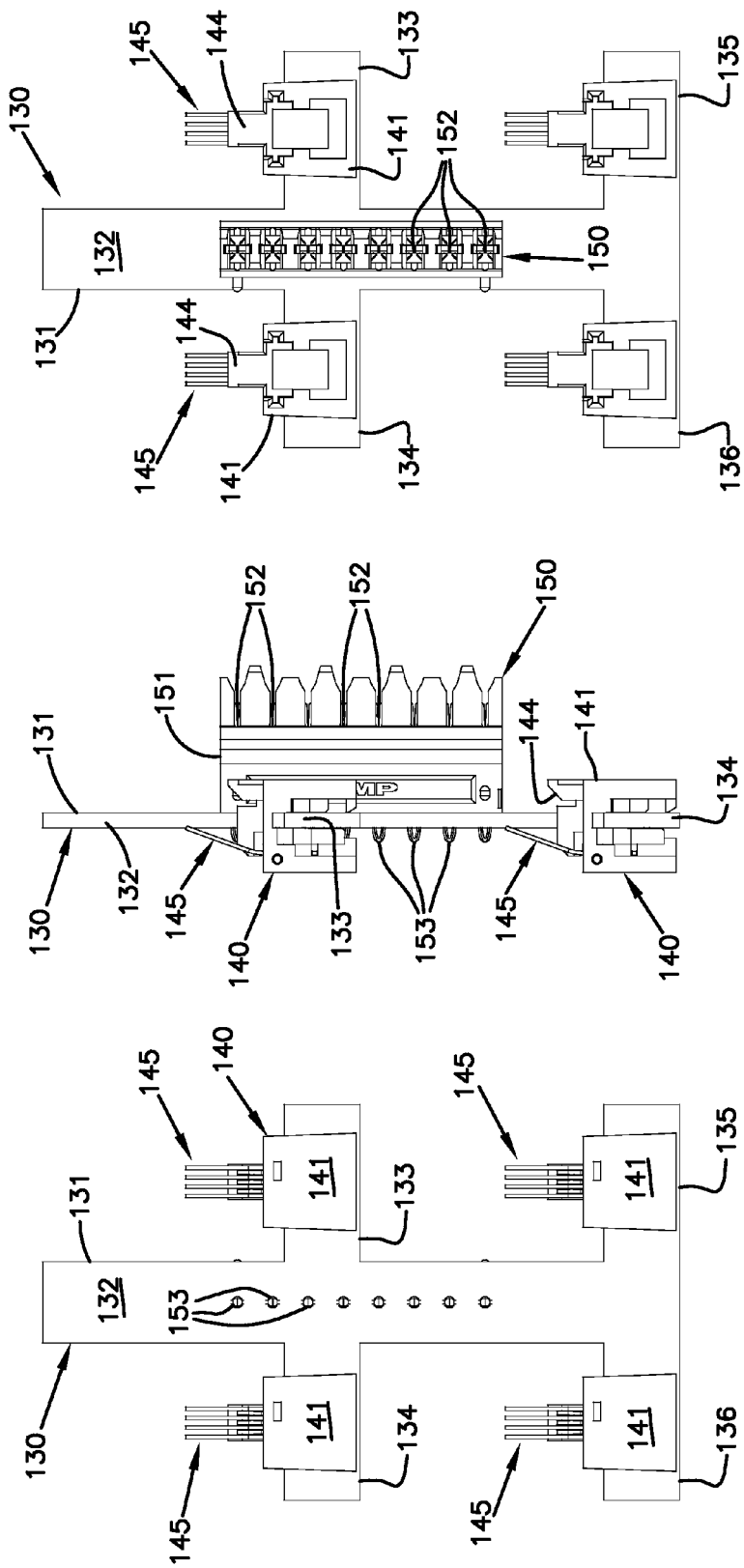

LOW PROFILE FACEPLATE HAVING MANAGED CONNECTIVITY

CROSS REFERENCE TO RELATED APPLICATION

This application claims the benefit of U.S. Provisional Application No. 61/707,242, filed Sep. 28, 2012, and titled "Low Profile Faceplate Having Managed Connectivity," the disclosure of which is hereby incorporated herein by reference.

BACKGROUND

Various electrical/fiberoptic connectors are known for use in the telecommunications industry to transmit voice, data and video signals. A common connector configuration includes a faceplate or outlet that is mounted on a structure such as a wall. The faceplate defines a plurality of openings in which connectors can be mounted. A typical connector includes a modular jack defining a port sized for receiving a conventional modular plug. Other conventional types of connectors include SC connectors, LC connector, MPO/MTP connector, ST connectors, MT-RJ connector, BNC connectors, USB connector, HDMI connector, S-Video connector, TERA connector, RJ-45 connector, F connectors and RCA connectors, for example.

SUMMARY

In accordance with some aspects of the disclosure, a faceplate assembly includes a faceplate member; at least one jack module; and a printed circuit board assembly. The faceplate member defines at least one opening extending between the front and the rear. The jack module is mounted in the opening of the faceplate member. The jack module defines a port accessible from the front of the faceplate member. The jack module includes primary contacts that are configured to attach to conductors that are accessible from the rear of the faceplate member. The printed circuit board assembly is mounted to the rear of the faceplate member. The printed circuit board assembly includes a printed circuit board; a first set of secondary contacts that are electrically connected to the printed circuit board; and a network connector that is electrically connected to the secondary contacts of the first set via the printed circuit board. The secondary contacts of the first set extend into the jack module. The secondary contacts of the first set are isolated from the primary contacts of the jack module.

In accordance with other aspects of the disclosure, a managed connectivity system includes a wall outlet faceplate assembly; a network analyzer; and a termination device. The wall outlet faceplate assembly includes flush-mounted jacks. Each jack includes primary contacts and secondary contacts isolated from the primary contacts. The faceplate assembly also includes a network connector that is electrically coupled to the secondary contacts of each jack. The network analyzer is electrically coupled to the network connector to receive signals from the secondary contacts of each jack. The termination device includes a plurality of electrical terminations. The primary contacts of at least one of the jacks is electrically connected to one of the electrical terminations.

In accordance with other aspects of the disclosure, a method of installing a managed connectivity system includes mounting at least one media reading interface with secondary contacts to a printed circuit board; mounting a network connector to the printed circuit board so that the network connector is electrically connected to the secondary contacts; mounting the printed circuit board to a rear of a faceplate member so that the secondary contacts extend into an opening defined in the faceplate member and the network connector extends rearwardly of the faceplate member; and mounting a jack module at the opening defined in the faceplate member so that the secondary contacts extend into an interior of the jack module and are accessible through a port defined by the jack module. The secondary contacts remain isolated from primary contacts of the jack module.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 11 is a schematic diagram of a first example managed connectivity system including the faceplate assembly of FIG. 6;

FIG. 12 is a schematic diagram of another example managed connectivity system including the faceplate assembly of FIG. 6 and a local processor;

FIG. 13 is a front perspective view of an example faceplate member and circuit board assembly of the faceplate assembly of FIG. 6;

FIG. 18 is a front perspective view of an example circuit board assembly of the faceplate assembly of FIG. 6;

FIG. 19 is a front elevational view of the board assembly of FIG. 18;

FIG. 20 is a rear perspective view of the board assembly of FIG. 18;

FIG. 21 is a rear elevational view of the board assembly of FIG. 18;

FIG. 22 is a side elevational view of the board assembly of FIG. 18;

DETAILED DESCRIPTION

Figure 1:
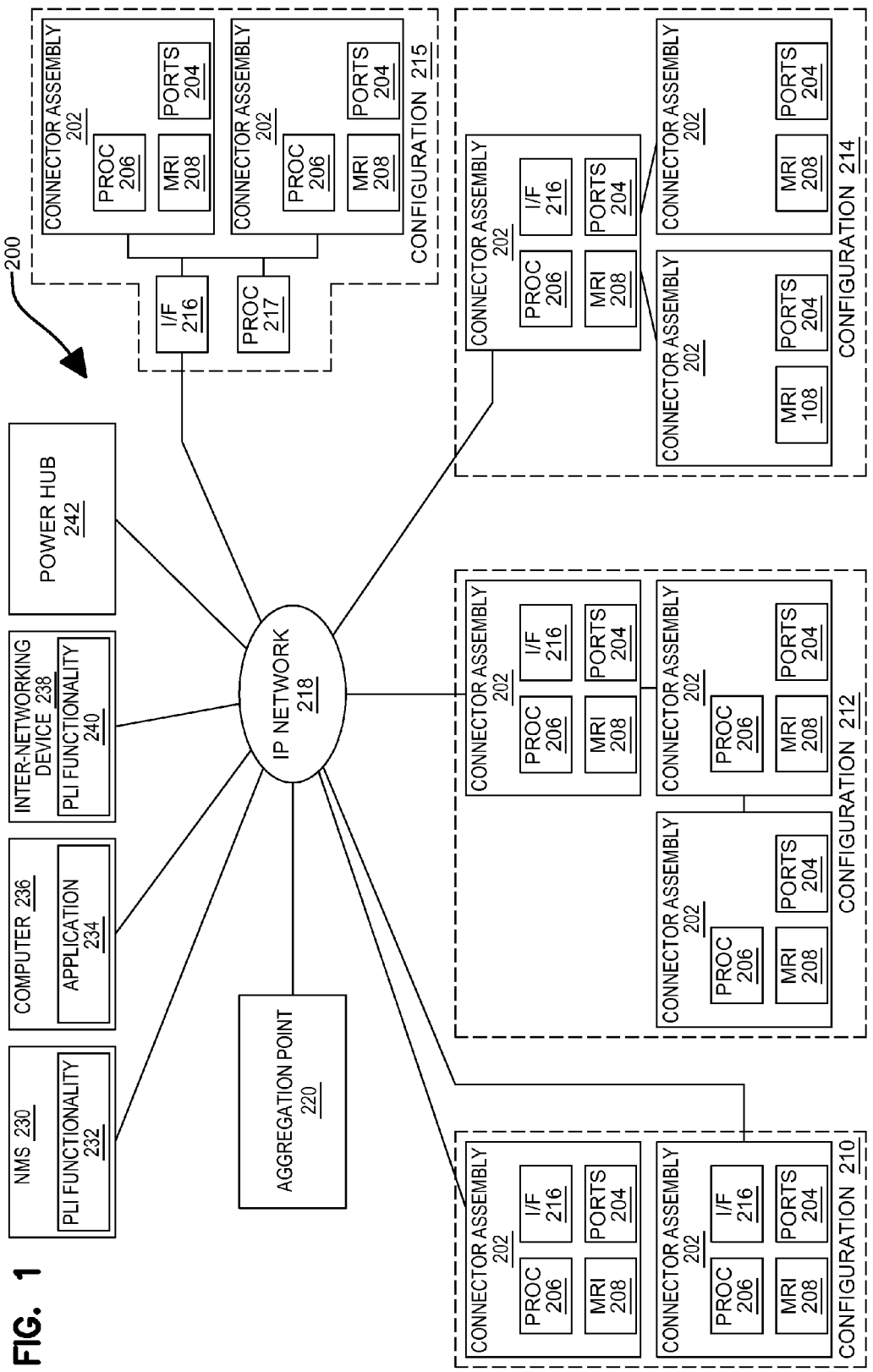
FIG. 1 is a block diagram of one example implementation of a communications management system that includes PLI functionality as well as PLM functionality.

Reference will now be made in detail to exemplary aspects of the present disclosure that are illustrated in the accompanying drawings. Wherever possible, the same reference numbers will be used throughout the drawings to refer to the same or like parts.

In accordance with some aspects of the disclosure, an example communications and data management system includes at least part of a communications network along which communications signals pass. Media segments connect equipment of the communications network. Non-limiting examples of media segments include optical cables, electrical cables, and hybrid cables. This disclosure will focus on electrical media segments. The media segments may be terminated with electrical plugs, electrical jacks, media converters, or other termination components.

In accordance with aspects of the disclosure, the communications and data management system provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the system. As the term is used herein, "PLM functionality" refers to the ability of a component or system to manipulate or to enable others to manipulate the physical components used to implement the physical layer of the system (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications system. Physical layer information of the communications system can include media information, device information, and location information. Media information refers to physical layer information pertaining to cables, plugs, connectors, and other such physical media. Non-limiting examples of media information include a part number, a serial number, a plug type, a conductor type, a cable length, cable polarity, a cable pass-through capacity, a date of manufacture, a manufacturing lot number, the color or shape of the plug connector, an insertion count, and testing or performance information. Device information refers to physical layer information pertaining to the communications panels, inter-networking devices, media converters, computers, servers, wall outlets, and other physical communications devices to which the media segments attach. Location information refers to physical layer information pertaining to a physical layout of a building or buildings in which the network is deployed.

In accordance with some aspects, one or more of the components (e.g., media segments, equipment, etc.) of the communications network are configured to store physical layer information pertaining to the component as will be disclosed in more detail herein. Some components include media reading interfaces that are configured to read stored physical layer information from the components. The physical layer information obtained by the media reading interface may be communicated over the network for processing and/or storage.

FIG. 1 is a block diagram of one example implementation of a communications management system 200 that includes PLI functionality as well as PLM functionality. The management system 200 comprises a plurality of connector assemblies 202 (e.g., patch panels, blades, optical adapters, electrical jacks, media converters, transceivers, etc.), connected to an IP network 218. Each connector assembly 202 includes one or more ports 204, each of which is configured to receive a media segment for connection to other media segments or equipment of the management system 200. For the purposes of this disclosure, electrical connector assemblies 202 and electrical media segments will be described. In other implementations, however, optical connector assemblies and media segments may be used.

At least some of the connector assemblies 202 are designed for use with electrical cables that have physical layer information stored in or on them. The physical layer information is configured to be read by a programmable processor 206 associated with one or more connector assemblies 202. In general, the programmable processor 206 communicates with memory of an electrical cable using a media reading interface 208. In some implementations, each of the ports 204 of the connector assemblies 202 includes a respective media reading interface 208. In other implementations, a single media reading interface 208 may correspond to two or more ports 204.

In FIG. 1, four example types of connector assembly configurations 210, 212, 214, and 215 are shown. In the first connector assembly configuration 210, each connector assembly 202 includes its own respective programmable processor 206 and its own respective network interface 216 that is used to communicatively couple that connector assembly 202 to an Internet Protocol (IP) network 218. In the second type of connector assembly configuration 212, connector assemblies 202 are grouped together in proximity to each other (e.g., in a rack, rack system, patch panel, chassis, or equipment closet). Each connector assembly 202 of the group includes its own respective programmable processor 206. However, not all of the connector assemblies 202 include their own respective network interfaces 216.

In the third type of connector assembly configuration 214, some of the connector assemblies 202 (e.g., "masters") in the group include their own programmable processors 206 and network interfaces 216, while others of the connector assemblies 202 (e.g., "slaves") do not include their own programmable processors 206 or network interfaces 216. Each programmable processor 206 is able to carry out the PLM functions for both the connector assembly 202 of which it is a part and any of the slave connector assemblies 202 to which the master connector assembly 202 is connected via the local connections.

In the fourth type of connector assembly configuration 215, each of the connector assemblies 202 in a group includes its own "slave" programmable processors 206. Each slave programmable processor 206 is configured to manage the media reading interfaces 208 to determine if physical communication media segments are attached to the port 204 and to read the physical layer information stored in or on the attached physical communication media segments (if the attached segments have such information stored therein or thereon). Each of the slave programmable processors 206 in the group also is communicatively coupled to a common "master" programmable processor 217. The master processor 217 communicates the physical layer information read from by the slave processors 206 to devices that are coupled to the IP network 218. For example, the master programmable processor 217 may be coupled to a network interface 216 that couples the master processor 217 to the IP network 218.

In accordance with some aspects, the communications management system 200 includes functionality that enables the physical layer information captured by the connector assemblies 202 to be used by application-layer functionality outside of the traditional physical-layer management application domain. For example, the management system 200 may include an aggregation point 220 that is communicatively coupled to the connector assemblies 202 via the IP network 218. The aggregation point 220 can be implemented on a standalone network node or can be integrated along with other network functionality.

The aggregation point 220 includes functionality that obtains physical layer information from the connector assemblies 202 (and other devices) and stores the physical layer information in a data store. The aggregation point 220 also can be used to obtain other types of physical layer information. For example, this information can be provided to the aggregation point 220, for example, by manually entering such information into a file (e.g., a spreadsheet) and then uploading the file to the aggregation point 220 (e.g., using a web browser) in connection with the initial installation of each of the various items. Such information can also, for example, be directly entered using a user interface provided by the aggregation point 220 (e.g., using a web browser).

The management system 200 also may include a network management system (NMS) 230 includes PLI functionality 232 that is configured to retrieve physical layer information from the aggregation point 220 and provide it to the other parts of the NMS 230 for use thereby. The NMS 230 uses the retrieved physical layer information to perform one or more network management functions. In certain implementations, the NMS 230 communicates with the aggregation point 220 over the IP network 218. In other implementations, the NMS 230 may be directly connected to the aggregation point 220.

An application 234 executing on a computer 236 also can use the API implemented by the aggregation point 220 to access the PLI information maintained by the aggregation point 220 (e.g., to retrieve such information from the aggregation point 220 and/or to supply such information to the aggregation point 220). The computer 236 is coupled to the IP network 218 and accesses the aggregation point 220 over the IP network 218.

One or more inter-networking devices 238 used to implement the IP network 218 include physical layer information (PLI) functionality 240. The PLI functionality 240 of the inter-networking device 238 is configured to retrieve physical layer information from the aggregation point 220 and use the retrieved physical layer information to perform one or more inter-networking functions. Examples of inter-networking functions include Layer 1, Layer 2, and Layer 3 (of the OSI model) inter-networking functions such as the routing, switching, repeating, bridging, and grooming of communication traffic that is received at the inter-networking device.

Additional details pertaining to example communications management system 200 can be found in U.S. Publication No. 2011/0115494, filed Oct. 19, 2010, and titled "Managed Electrical Connectivity Systems," the disclosure of which is hereby incorporated herein by reference.

Figure 2:
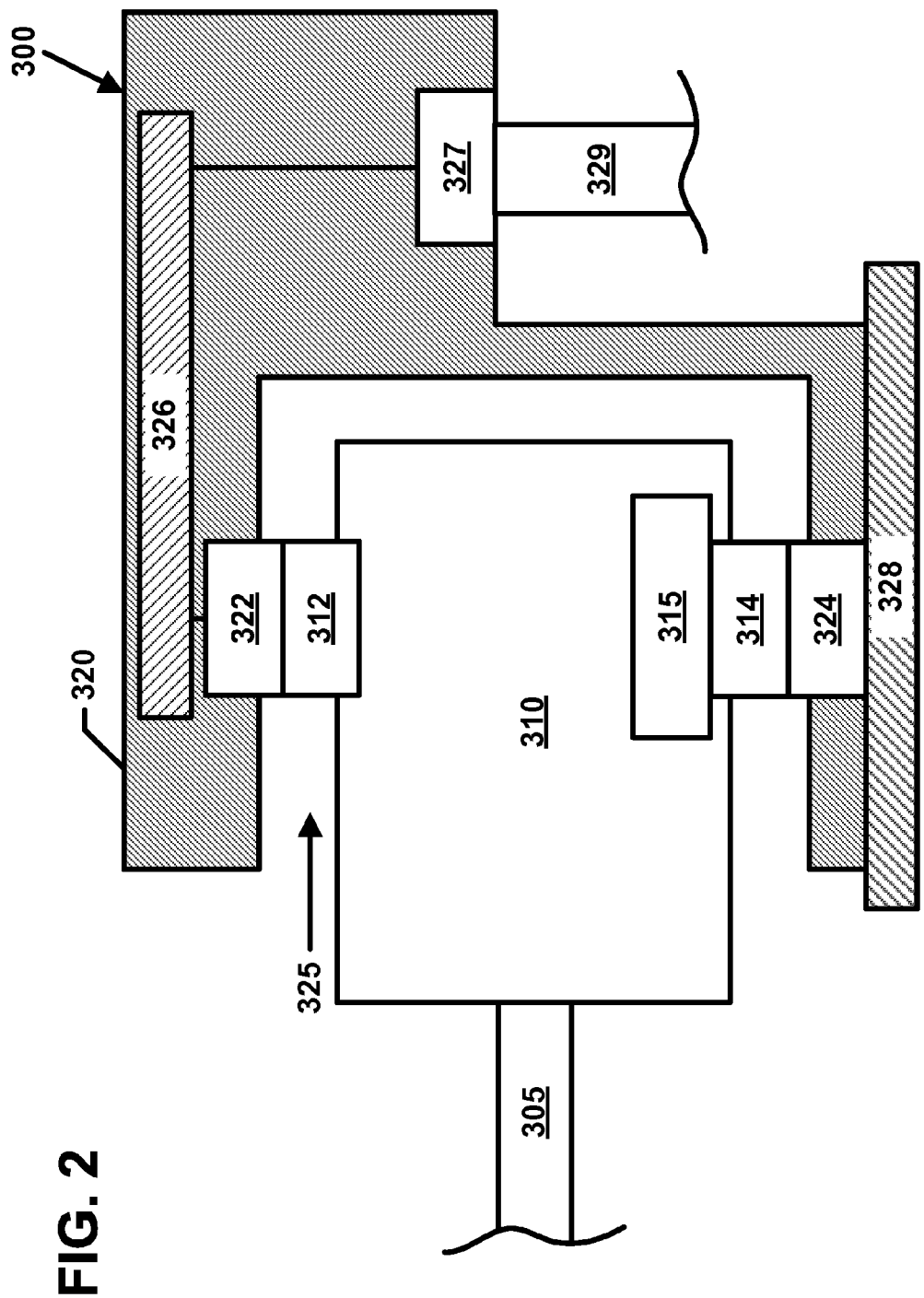
FIG. 2 is a schematic diagram of one example connector assembly configured to collect physical layer information from a connector arrangement terminating a media segment.

FIG. 2 is a schematic diagram of one example connector assembly configured to collect physical layer information from a connector arrangement terminating a media segment. The connector assembly is implemented as a jack module 320 and the connector arrangement is implemented as an electrical plug connector 310. The plug connector 310 terminates at least a first electrical media segment (e.g., a conductor cable) 305 and the jack module 320 terminates at least second electrical media segments (e.g., twisted pairs of copper wires) 329. The jack module 320 defines at least one socket port 325 in which the plug connector 310 can be accommodated.

Each electrical segment 305 of the plug connector 310 carries communication signals to primary contact members 312 on the plug connector 310. The jack module 320 includes a primary contact arrangement 322 that is accessible from the socket port 325. The primary contact arrangement 322 is aligned with and configured to interface with the primary contact members 312 to receive the communications signals from the primary contact members 312 when the plug connector 310 is inserted into the socket 325 of the jack module 320.

The jack module 320 is electrically coupled to one or more printed circuit boards. For example, the jack module 320 can support or enclose a first printed circuit board 326, which connects to insulation displacement contacts (IDCs) 327 or to another type of electrical contacts. The IDCs 327 terminate the electrical segments 329 of physical communications media (e.g., conductive wires). The first printed circuit board 326 manages the primary communication signals carried from the conductors terminating the cable 305 to the electrical segments 329 that couple to the IDCs 327.

In accordance with some aspects, the plug connector 310 can include a storage device 315 configured to store physical layer information. The connector arrangement 310 also includes second contact members 314 that are electrically coupled (i.e., or otherwise communicatively coupled) to the storage device 315. In one implementation, the storage device 315 is implemented using an EEPROM (e.g., a PCB surface-mount EEPROM). In other implementations, the storage device 315 is implemented using other non-volatile memory device. Each storage device 315 is arranged and configured so that it does not interfere or interact with the communications signals communicated over the media segment 305.

The jack module 320 also includes a second contact arrangement (e.g., a media reading interface) 324. In certain implementations, the media reading interface 324 is accessible through the socket port 325. The second contact arrangement 324 is aligned with and configured to interface with the second contact members 314 of the plug connector 310 to receive the physical layer information from the storage device 315 when the plug connector 310 is inserted into the socket 325 of the jack module 320.

In some such implementations, the storage device interfaces 314 and the media reading interfaces 324 each include three (3) leads—a power lead, a ground lead, and a data lead. The three leads of the storage device interface 314 come into electrical contact with three (3) corresponding leads of the media reading interface 124 when the corresponding media segment is inserted in the corresponding port 325. In other example implementations, a two-line interface is used with a simple charge pump. In still other implementations, additional leads can be provided (e.g., for potential future applications).

The jack module 320 also can support, enclose, or otherwise be coupled to a second printed circuit board 328, which connects to the second contact arrangement 324. The second printed circuit board 328 manages the physical layer information communicated from the storage device 315 through second contacts 314, 324. In the example shown, the second printed circuit board 328 is positioned on an opposite side of the jack module 320 from the first printed circuit board 326. In other implementations, the printed circuit boards 326, 328 can be positioned on the same side or on different sides. In one implementation, the second printed circuit board 328 is positioned horizontally relative to the jack module 320. In another implementation, the second printed circuit board 328 is positioned vertically relative to the jack module 320.

The second printed circuit board 328 can be communicatively connected to one or more programmable electronic processors (e.g., processor 206 of FIG. 1) and/or one or more network interfaces (e.g., interface 216 of FIG. 1). In one implementation, one or more such processors and interfaces can be arranged as components on the printed circuit board 328. In another implementation, one of more such processor and interfaces can be arranged on a separate circuit board that is coupled to the second printed circuit board 328. For example, the second printed circuit board 328 can couple to other circuit boards via a card edge type connection, a connector-to-connector type connection, a cable connection, etc. The network interface is configured to send the physical layer information to the data network.

Figure 3:
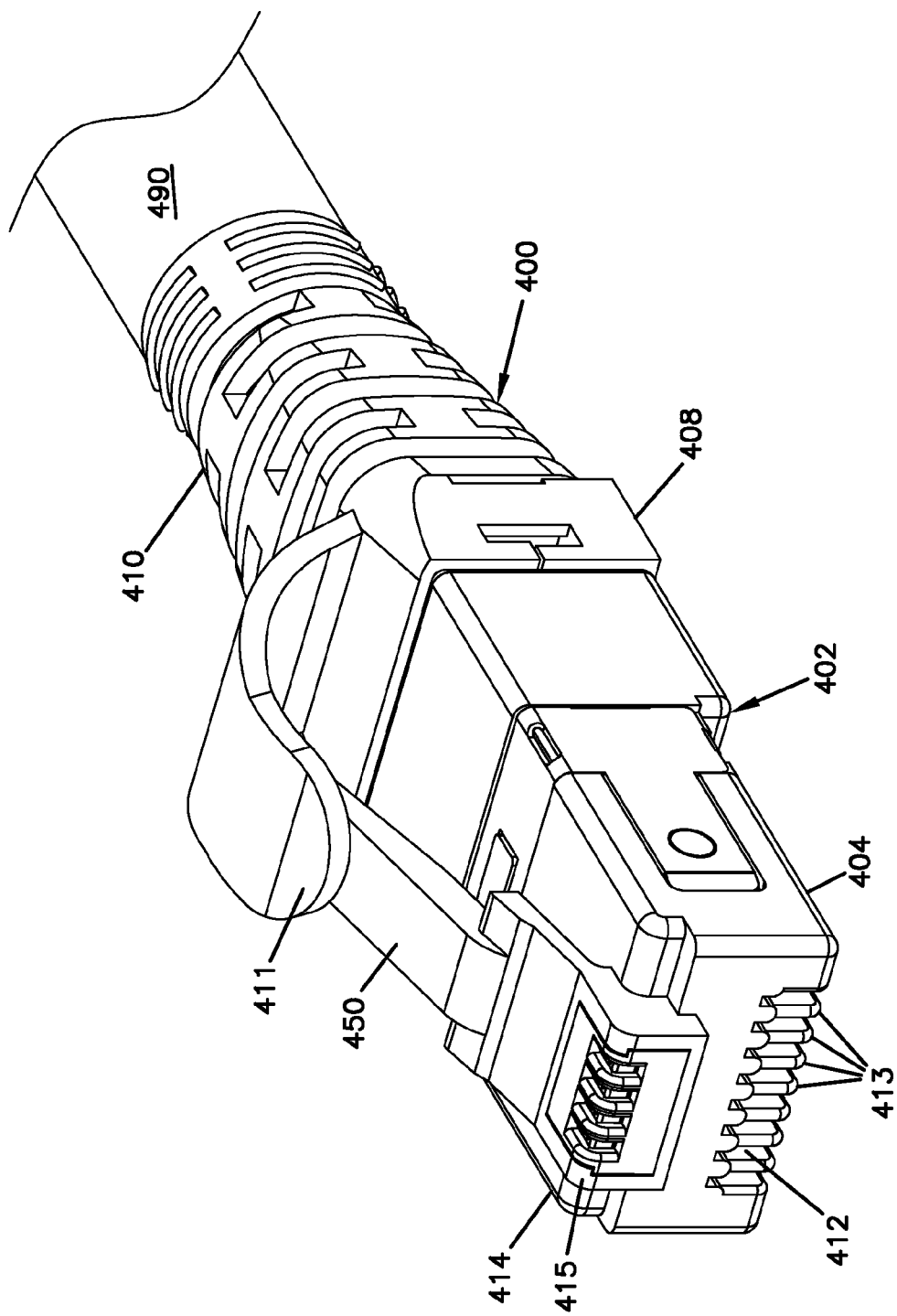
FIGS. 3 and 4 show one example implementation of connector arrangement in the form of an electrical plug connector for terminating an electrical communications cable.
Figure 4:
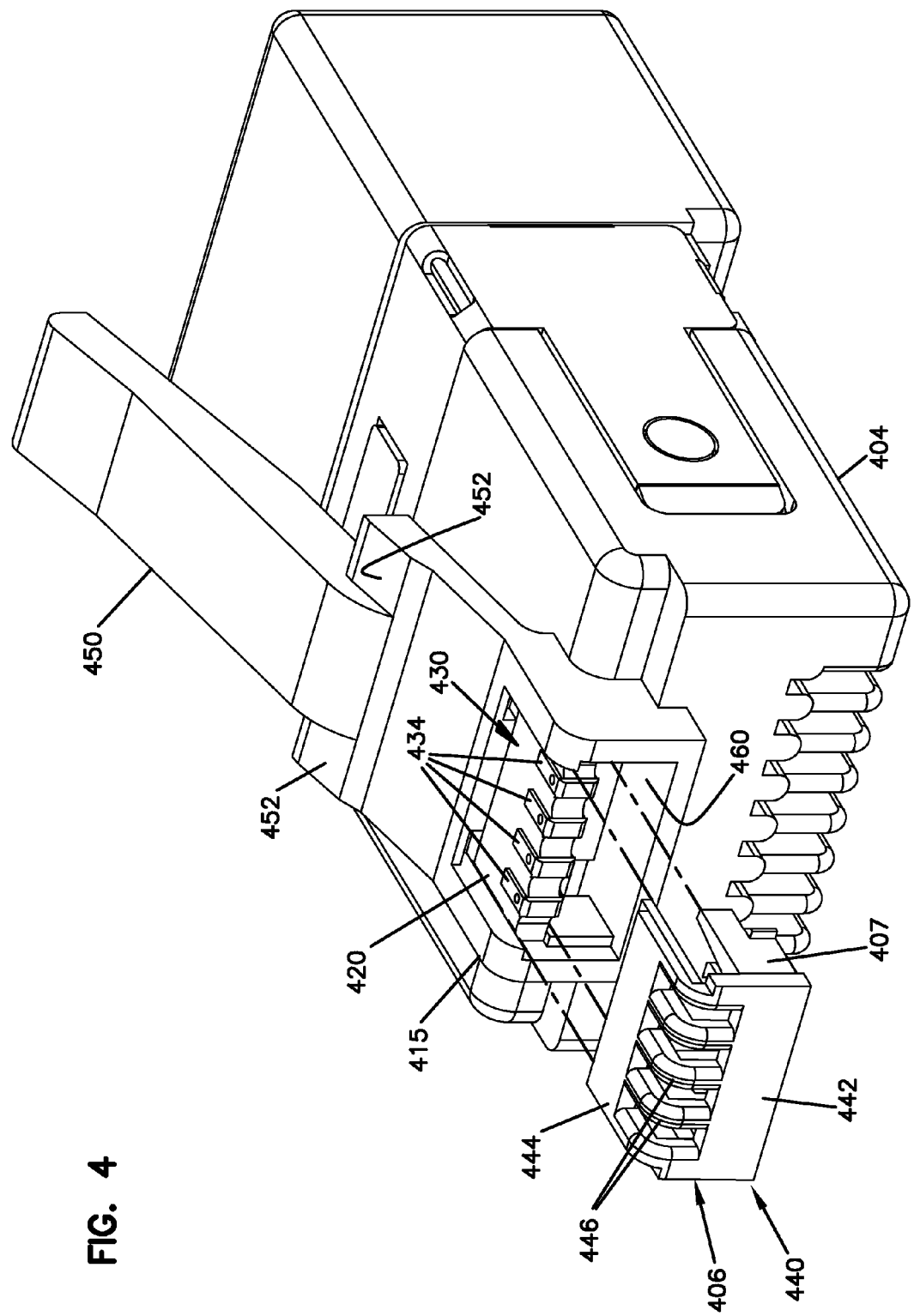
Figure 5:
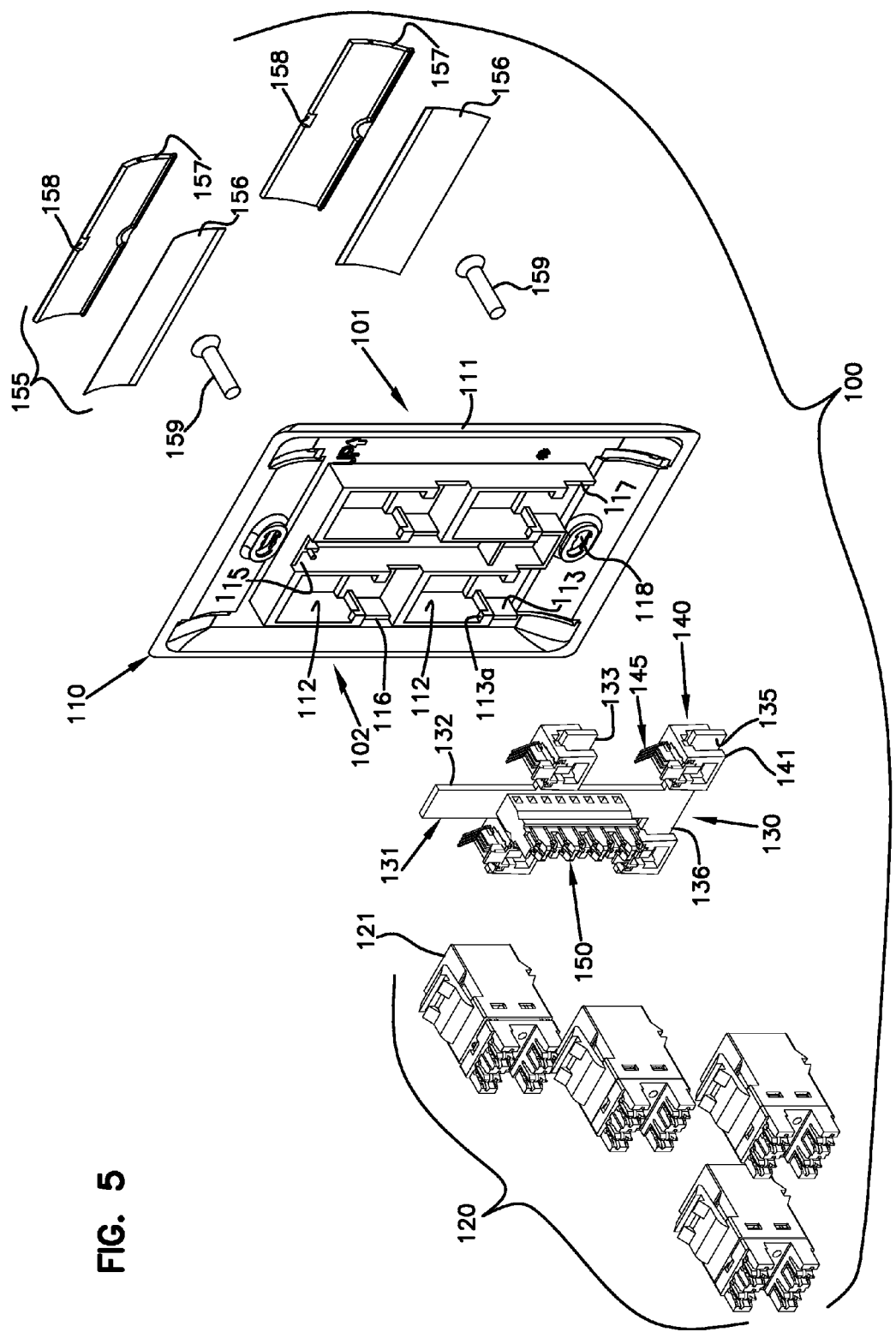
FIG. 5 is a rear perspective view of an example faceplate assembly with various components exploded away from each other.

FIGS. 3 and 4 show one example implementation of connector arrangement 400 in the form of an electrical plug connector 402 for terminating an electrical communications cable 490. The plug connector 402 is configured to be received within a port of a jack module (e.g., jack module 320 of FIG. 2). In the example shown, the plug connector 402 is an RJ plug that is configured to connect to the end of a twisted pair copper cable 490 through an RJ jack (e.g., see jack block 120 of FIGS. 23 and 24).

The plug connector 402 includes a plug nose body 404 that can be attached to a wire manager 408 and/or a boot 410. The plug nose body 404 includes a finger tab 450 and a key member 415 at a first side 414 of the plug 402. The plug nose body 404 holds main signal contacts 412 at a second side 416 of the plug 402. The main signal contacts 412 are electrically connected to conductors (e.g., twisted pair conductors) of the communications cable 490. Ribs 413 protect the main signal contacts 412.

The plug connector 402 is configured to store physical layer information (e.g., an identifier and/or attribute information) pertaining to the electrical cable 490 terminated thereat. In certain implementations, a storage device 430 may be installed on or in the plug body 404 (see FIG. 4). For example, in some implementations, the key member 415 of the plug nose body 404 defines a cavity 460 (FIG. 4) in which the storage device 430 can be stored. In some implementations, the plug 402 includes a plug cover 406 that mounts on the plug nose body 404 to close the cavity 460. Contact members 434 of the storage device 430 are accessible through slots 446 in the key member 415 or plug cover 406.

In some embodiments, the storage device 430 includes a printed circuit board 420. In the example shown, the circuit board 420 can be slid or otherwise positioned along guides defined in the cavity 460. The circuit board 420 includes a substrate with conductive traces electrically connecting contacts and lands. The circuit board 420 also includes circuit components, such as an EEPROM, at the lands. In other embodiments, however, the storage device 430 can include any suitable type of memory. The contact members 434 permit connection of the EEPROM or other memory circuitry to a media reading interface of a coupler assembly as will be described herein. Additional details pertaining to the plug 402 can be found in U.S. Publication No. 2011/0115494 (incorporated by reference above).

FIGS. 5-10 illustrate one example faceplate assembly 100 configured to receive one or more plugs connectors 402. The faceplate assembly 100 includes a front 101, a rear 102, a top 103, a bottom 104, a first side 105, and a second side 106 (see FIGS. 7 and 10). The faceplate assembly 100 includes a faceplate member 110 that defines one or more openings 112 extending therethrough between the front 101 and rear 102. In the example shown, the faceplate member 110 defines four openings 112. In other implementations, the faceplate member 110 defines a greater or lesser number of openings 112. A perimeter 111 of the faceplate member 110 is tapered or contoured rearwardly.

One or more jack modules 120 are configured to mount within the openings 112 from the rear 102 of the faceplate member 110. As will be described in more detail herein, each jack module 120 defines a port 122 that is accessible from the front 101 of the faceplate member 110 (see FIG. 6). In some implementations, the jack modules 120 include one or more primary electrical contacts 125 (FIG. 24) disposed within the port 122 and accessible from the front 101 of the faceplate member 110 when the jack 110 is mounted at the opening 112. Each jack module 120 also includes rear contacts 123 (FIG. 8) that are coupled to the primary contacts 125. The rear contacts 123 are accessible from the rear 102 of the faceplate member 110 (see FIG. 8). In other implementations, however, the jack modules 120 may include optical connection structures (e.g., adapter sleeves) to enable optical coupling of optical fiber plug connectors at opposite sides of the jack module 120. For convenience, electrical jack modules 120 will be discussed herein with reference to the faceplate assembly 100.

A circuit board assembly 130 also is mounted to the rear 102 of the faceplate member 110. The circuit board assembly 130 includes a circuit board 131 (e.g., a rigid printed circuit board, a flexible circuit board, etc.). One or more media reading interfaces 140 are mounted to the circuit board assembly 130. Each of the media reading interfaces 140 includes one or more secondary contacts 145 that are electrically coupled to the circuit board 131. A network connector 150 also is coupled to the circuit board assembly 130. The network connector 150 is electrically connected to the secondary contacts 145 of each of the media reading interfaces 140. The network connector 150 includes network contacts that are accessible from the rear 102 of the faceplate member 110 for connection to the secondary contacts 145.

When a plug connector (e.g., plug connector 402 of FIGS. 3 and 4) is inserted into the port 122 of one of the jack modules 120, main signal contacts 412 of the plug 402 engage the primary contacts 125 of the jack module 120. Communications data signals carried over a cable to the plug 402 are received via the main signal contacts 412 at the primary contacts 125, through which the communications data signals reach the rear contacts 123. The contact members 434 of the connector storage device 430 engage the secondary contacts 145 of the media reading interface 140. Management data signals from the connector storage device 430 are received at the secondary contacts 145, through which the management data signals reach the network connector 150.

The faceplate assembly 100 can be secured to a wall or other surface using one or more fasteners 159 (e.g., a screw, a nail, a bolt, etc.). In some implementations, the faceplate member 110 defines one or more fastener openings 118 that extend through the faceplate member 110 from the front 101 to the rear 102. In certain implementations, the faceplate member 110 includes a first fastener opening 118 at a top 103 of the assembly 100 and a second fastener opening 118 at a bottom 104 of the assembly 100. Each fastener opening 118 is sized to receive at least one fastener 159.

The faceplate member 110 is configured to engage the wall or other surface along a peripheral edge. The contoured perimeter 111 of the faceplate member 110 has a depth D between a front surface of the faceplate member 110 and the peripheral edge. Accordingly, the depth D is the distance the front surface is offset from the wall or other surface to which the faceplate assembly 100 is secured. In some implementations, the depth D is no more than about 0.3 inches. In certain implementations, the depth D is no more than about 0.27 inches. In certain implementations, the depth D is no more than about 0.24 inches. In certain implementations, the depth D is no more than about 0.23 inches. In certain implementations, the depth D is no more than about 0.22 inches.

In certain implementations, the fastener openings 118 are recessed into the contoured perimeter 111 of the faceplate member 110. For example, the first fastener opening 118 may be disposed at a first recessed region 113 defined in the top 103 of the perimeter 111 and the second fastener opening 118 may be disposed at a second recessed region 113 defined in the bottom 104 of the perimeter 111 (e.g., see FIG. 8). In certain implementations, multiple fastener openings 118 can be disposed at one or more of the recessed regions 113. In other implementations, the recessed regions 113 may be located elsewhere on the faceplate member 110.

In some implementations, a label arrangement 155 mounts to the faceplate member 110 over the recessed region 113 to cover the fastener 159 seated in the recessed region 113. In other implementations, the label arrangement 155 is mounted over a recessed region 113 that does not define a fastener opening 118. The label arrangement 155 includes a label sheet 156 and a protective cover 157. The label sheet 156 is configured to receive a label (e.g., verbal or graphic indicia) that indicates the equipment to which the port connects, the type of plug to be received at the port, or other such information. The cover 157 is sufficiently translucent that a user may view the label displayed on the label sheet through the cover 157. In some implementations, the cover 157 secures (e.g., latches, friction fits, snap-fits, etc.) the label sheet 156 to the faceplate member 110.

FIG. 11 illustrates one example managed connectivity system 200 that includes at least one faceplate assembly 100 that is connected to termination equipment 210 (e.g., a patch panel, a switch, a router, etc.) and network analyzing equipment 220. The termination equipment 210 is configured to receive communications data signals from the jack modules 120 of the faceplate assembly 100. For example, the termination equipment 210 receives communications data signals that were received at the primary contacts of the jack modules 120. The network analyzing equipment 220 is configured to receive management data signals from the network connector 150 of the faceplate assembly 100. For example, the network analyzing equipment 220 receives management data signals that were received at the secondary contacts 145 of the media reading interfaces 140.

In certain implementations, the termination equipment 210 and network analyzing equipment 220 are located in the same general location (e.g., same room, same floor, etc.). In other implementations, the termination equipment 210 and network analyzing equipment 220 are located in different locations (e.g., different floors, different buildings, etc.). In some implementations, multiple faceplate assemblies are coupled to the same termination equipment 210 and/or network analyzer equipment 220. In some implementations, the termination equipment 210 and network analyzing equipment 220 are located remote (e.g., different room, different floor, different building, etc.) from one or more of the faceplate assemblies 100. For example, one or both of the termination equipment 210 and network analyzer 220 may be coupled to one or more of the faceplate assemblies 100 over a network connection. In other implementations, one or both of the termination equipment 210 and network analyzer 220 may be coupled to one or more of the faceplate assemblies 100 over a direct (e.g., wires, wireless, etc.) connection.

In some implementations, an electronic memory and processor are mounted to the faceplate assembly 100. For example, the electronic memory and processor may be mounted to the circuit board assembly 130. The electronic memory may store a unique ID that corresponds to the faceplate assembly as a whole. The processor may be configured to read the management data from the storage devices 430 of the plugs 402 received at the jack modules 120. In certain implementations, the processor may be configured to determine when the plug 402 is inserted and to read based on the insertion.

FIG. 12 illustrates one example managed connectivity system 250 that also includes at least one faceplate assembly 100 that is connected to termination equipment 210 (e.g., a patch panel, a switch, a router, etc.) and network analyzing equipment 220. The termination equipment 210 is configured to receive communications data signals from the jack modules 120 of the faceplate assembly 100. The network analyzing equipment 220 is electrically coupled to the network connector 150 of the faceplate assembly 100. A local processor 260 is electrically connected between the network connector 150 and the network analyzing equipment 220. The local processor 260 accesses the storage device 430 on the plug connector 402 via the network connector 150 and the secondary contacts 145 to obtain the management data signals. The local processor 260 sends the management data to the network analyzer 220. In certain implementations, the local processor 260 can detect an insertion of a plug 402 at the jack module 120 and reads the storage device 430 in response to the detected insertion.

In certain implementations, the termination equipment 210 and network analyzing equipment 220 are located in the same general location (e.g., same room, same floor, etc.). In other implementations, the termination equipment 210 and network analyzing equipment 220 are located in different locations (e.g., different floors, different buildings, etc.). The local processor 260 is disposed closer to the faceplate assembly 100 than the termination equipment 210 and network analyzing equipment 220. In some implementations, the local processor 260 is located within fifty feet of the faceplate assembly 100. In certain implementations, the local processor 260 is located within forty feet of the faceplate assembly 100. In certain implementations, the local processor 260 is located within thirty feet of the faceplate assembly 100. In certain implementations, the local processor 260 is located about twenty-five feet from the faceplate assembly 100. For example, the local processor 260 may be located in a ceiling above a wall to which the faceplate assembly 100 is mounted.

In some implementations, multiple faceplate assemblies are coupled to the same termination equipment 210 and/or network analyzer equipment 220. In certain implementations, one local processor 260 can service multiple faceplate assemblies 100. In other implementations, each faceplate assembly 100 has its own local processor 260. In some implementations, the termination equipment 210 and network analyzing equipment 220 are located remote (e.g., different room, different floor, different building, etc.) from one or more of the faceplate assemblies 100. For example, one or both of the termination equipment 210 and network analyzer 220 may be coupled to one or more of the faceplate assemblies 100 over a network connection. In other implementations, one or both of the termination equipment 210 and network analyzer 220 may be coupled to one or more of the faceplate assemblies 100 over a direct (e.g., wires, wireless, etc.) connection.

Figure 15:
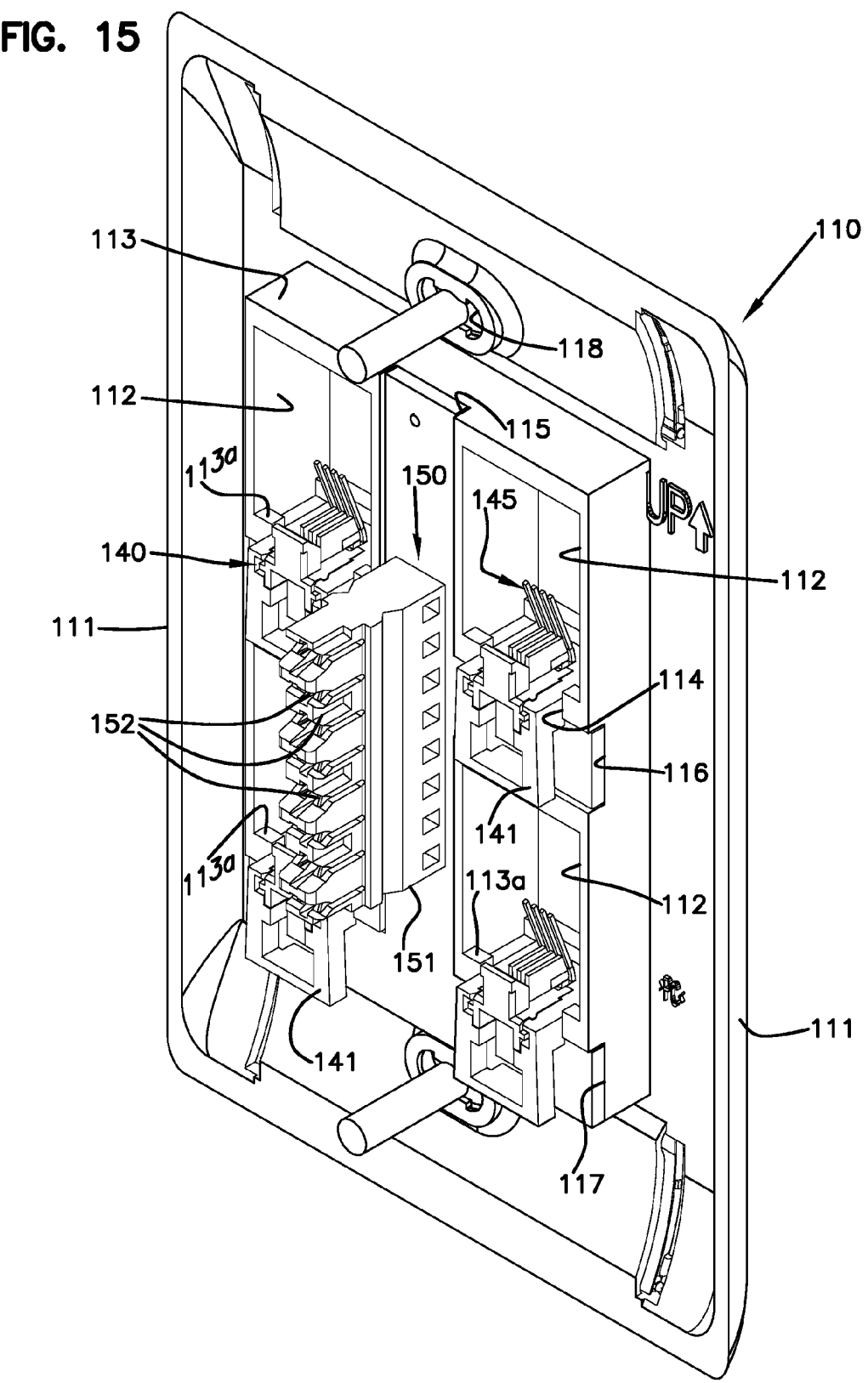
FIG. 15 is a rear perspective view of the faceplate member and circuit board assembly of FIG. 13.
Figure 16:
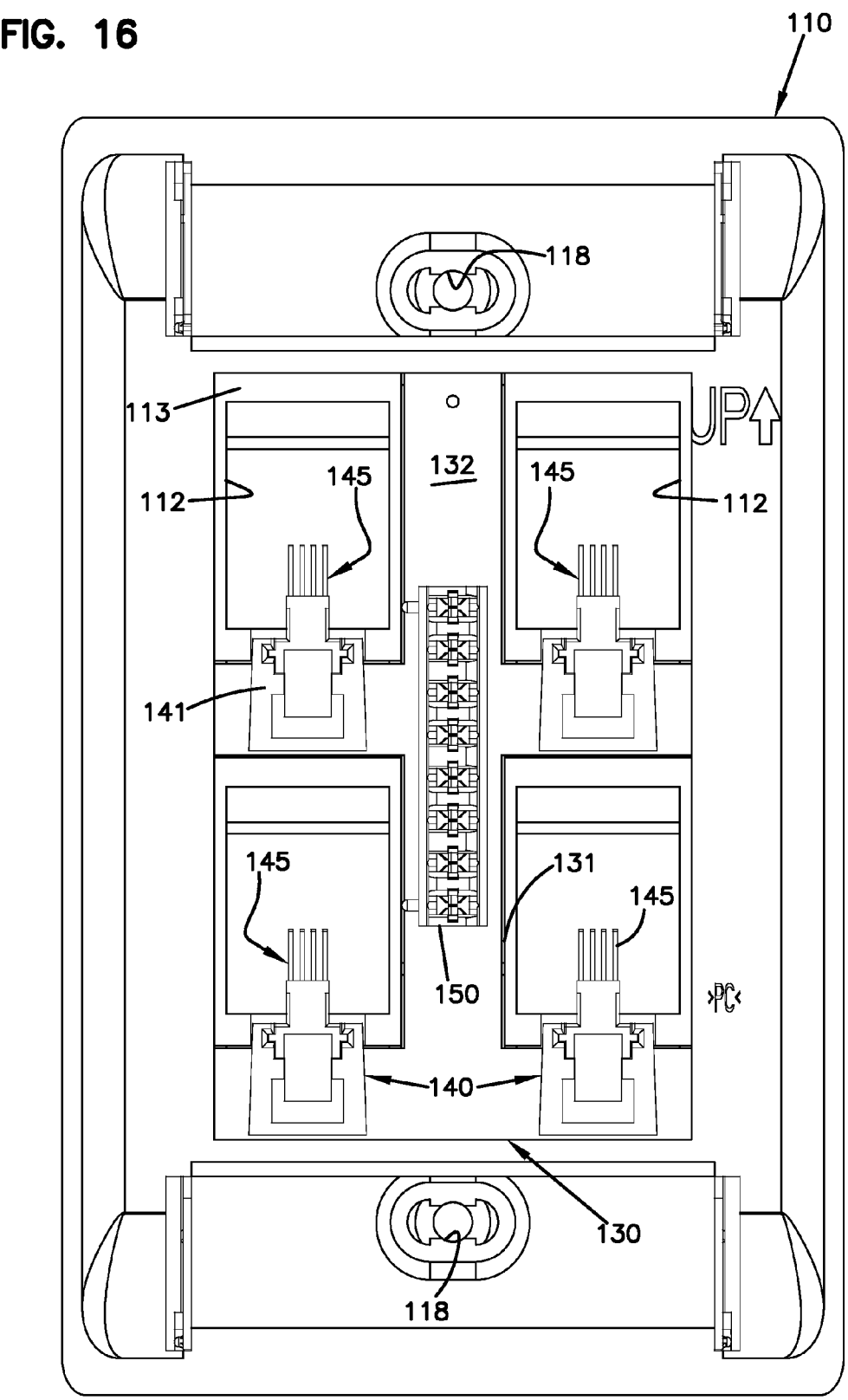
FIG. 16 is a rear elevational view of the faceplate member and circuit board assembly of FIG. 13.

FIGS. 13-17 illustrate one example implementation of a faceplate member 110 suitable for use in the faceplate assembly 100 disclosed herein. The faceplate member 110 includes a front surface through which one or more openings 112 are defined. In certain implementations, the front surface is generally flat. In the example shown, the front surface defines four openings 112. In other implementations, however, the front surface can define a greater or lesser number of openings (e.g., one, two, six, etc.). The covers 157 of two label assemblies 155 are shown mounted to the contoured peripheral edges 111 of the faceplate member 110. As shown in FIGS. 15 and 16, the covers 157 inhibit access to fasteners 151 extending through fastener openings 118 from the front 101 of the faceplate member 110.

Figure 17:
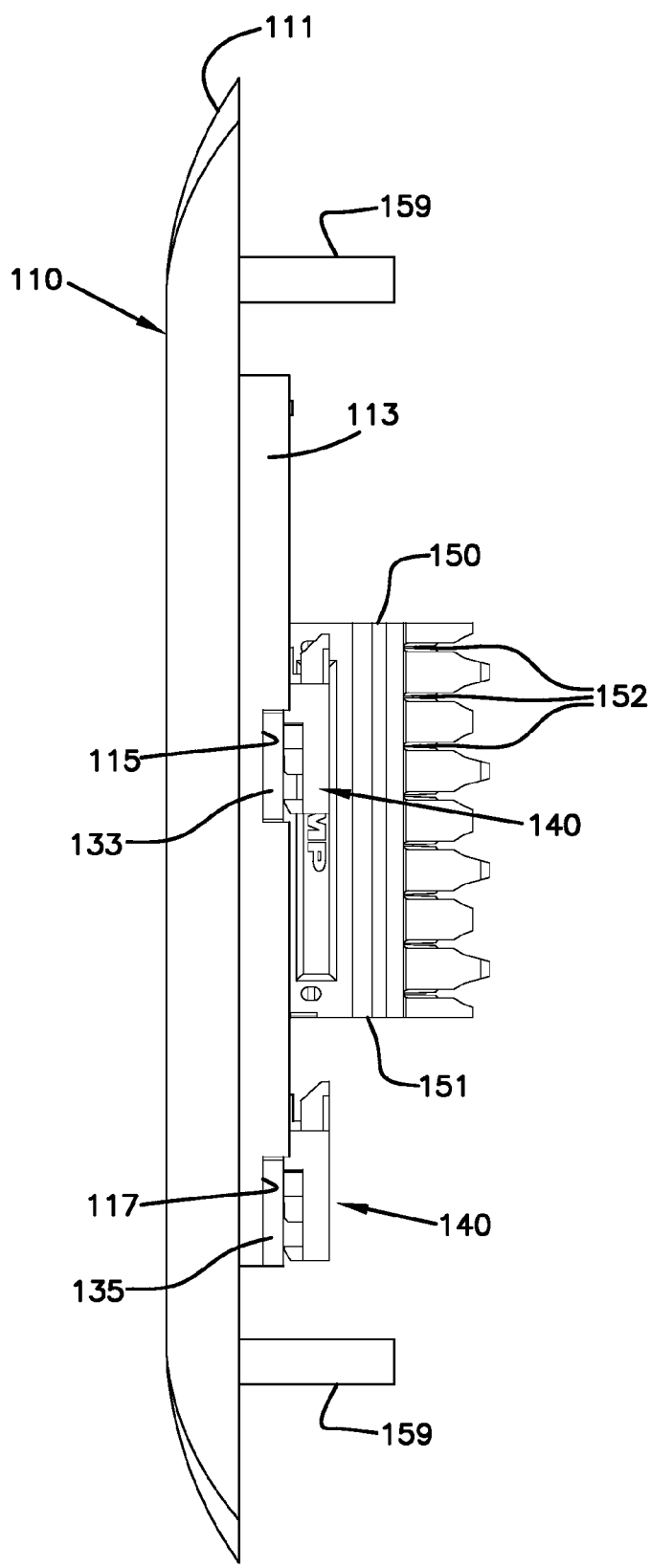
FIG. 17 is a side elevational view of the faceplate member and circuit board assembly of FIG. 13.

As shown in FIG. 15, the rear 102 of the faceplate member 110 includes a rearwardly extending support frame 113. The support frame 113 extends around an outer perimeter of each opening 112, thereby defining a depth for each opening 112. As shown in FIG. 17, the support frame 113 extends rearwardly further than the contoured edges 111. Recessed sections 115, 116, 117 are defined in the support frame 113 to provide space to accommodate the circuit board assembly 130 as will be described in more detail herein. In some implementations, the recessed sections 115-117 define continuous channels that extend through the support frame 113. In other implementations, the recessed sections 115-117 define cutouts in sections of the support frame 113 (e.g., see FIG. 5).

A first recessed section 115 extends through the support frame 113 in a top-bottom direction. For example, the first recessed section 115 may separate the openings 112 of the faceplate member 110 into left openings 112 and right openings 112. The second and third recessed sections 116, 117 extend through the support frame 113 in a first side-second side direction. For example, the second recessed section 116 may separate the openings 112 of the faceplate member 112 into top openings 112 and bottom openings 112. The third recessed section 117 may extend through the support frame 113 either above the top openings 112 or below the bottom openings 112 (see FIG. 5).

FIGS. 18-22 illustrate one example circuit board assembly 130 suitable for use in the faceplate assembly 100 disclosed herein. The circuit board assembly 130 includes a printed circuit board 131 on which one or more media reading interfaces 140 are disposed. In some implementations, the printed circuit board 131 is a rigid circuit board. In other implementations, the printed circuit board 131 is a flexible circuit board. The circuit board 131 is configured to mount to the rear 102 of the faceplate member 110. In certain implementations, the circuit board 131 is configured to mount to the support frame 113 of the faceplate member 110. The circuit board 131 has a front face 137 and a rear face 138. The front face 137 faces the rear of the faceplate member 110 when the circuit board assembly 130 is mounted to the faceplate member 110.

The circuit board 131 includes a main section 132 from which one or more segments branch off. In certain implementations, the number of branched segments is equal to the number of openings 112. In other implementations, openings 112 may share branched segments. In the example shown, a first segment 133 branches from the main section 132 towards a top, first side opening 112; a second segment 134 branches from the main section 132 towards a top, second side opening 112; a third segment 135 branches from the main section 132 towards a bottom, first side opening 112; and a fourth segment 136 branches from the main section 132 towards a bottom, second side opening 112. Accordingly, each branched segment 133-136 extends beneath and across one of the openings 112 (e.g., see FIGS. 15 and 16).

Generally, a media reading interface 140 is disposed at each opening 112 of the faceplate 110. A media reading interface 140 can be mounted over one or more of the branched segments 133-136. In the example shown, a single media reading interface 140 is mounted to each branch segment 133-136. In other implementations, multiple media reading interfaces 140 may be mounted to one or more of the branch segments 133-136. Each media reading interface 140 includes a body 141 that is configured to mount to the circuit board assembly 130. In the example shown, the body 141 is U-shaped and defines a notch 142 that is sized to receive one of the branched segments 133-136. The body 141 extends over the front face 137, rear face 138, and a side edge of the branched segment to retain the body 141 on the branched segment.

A support ramp 144 extends upwardly from the body 141 towards the rear face 138 of the circuit board 131. The secondary contacts 145 also extend upwardly from the body 141. For example, the secondary contacts 145 extend into a corresponding opening 112 at which the media reading interface 140 is mounted. The secondary contacts 145 are configured to flex rearwardly towards the support ramp 144 when a plug connector (e.g., plug 402 of FIGS. 3 and 4) is inserted through the corresponding opening 112. The support ramp 144 inhibits the secondary contacts 145 from flexing sufficiently far to be out of contact with the plug connector.

The network connector 150 is mounted to the circuit board assembly 130. In the example shown, the network connector 150 includes a connector body 151 that is mounted at the rear face 138 of the circuit board 131. Rear contacts 152 face rearwardly from the connector body 151. Front contacts 153 extend into/through the circuit board 131 (see FIG. 18). In some implementations, the network connector 150 includes a D-block. In other implementations, the network connector 150 can be any other type of connector (e.g., an RJ-11 connector, an RFID transceiver, etc.). The network connector 150 includes rear and front contacts 152, 153 that carry power, ground, and a data line for each media reading interface 140. The network connector 150 is isolated from the primary contacts 125 of the jack modules 120.

Figure 23:
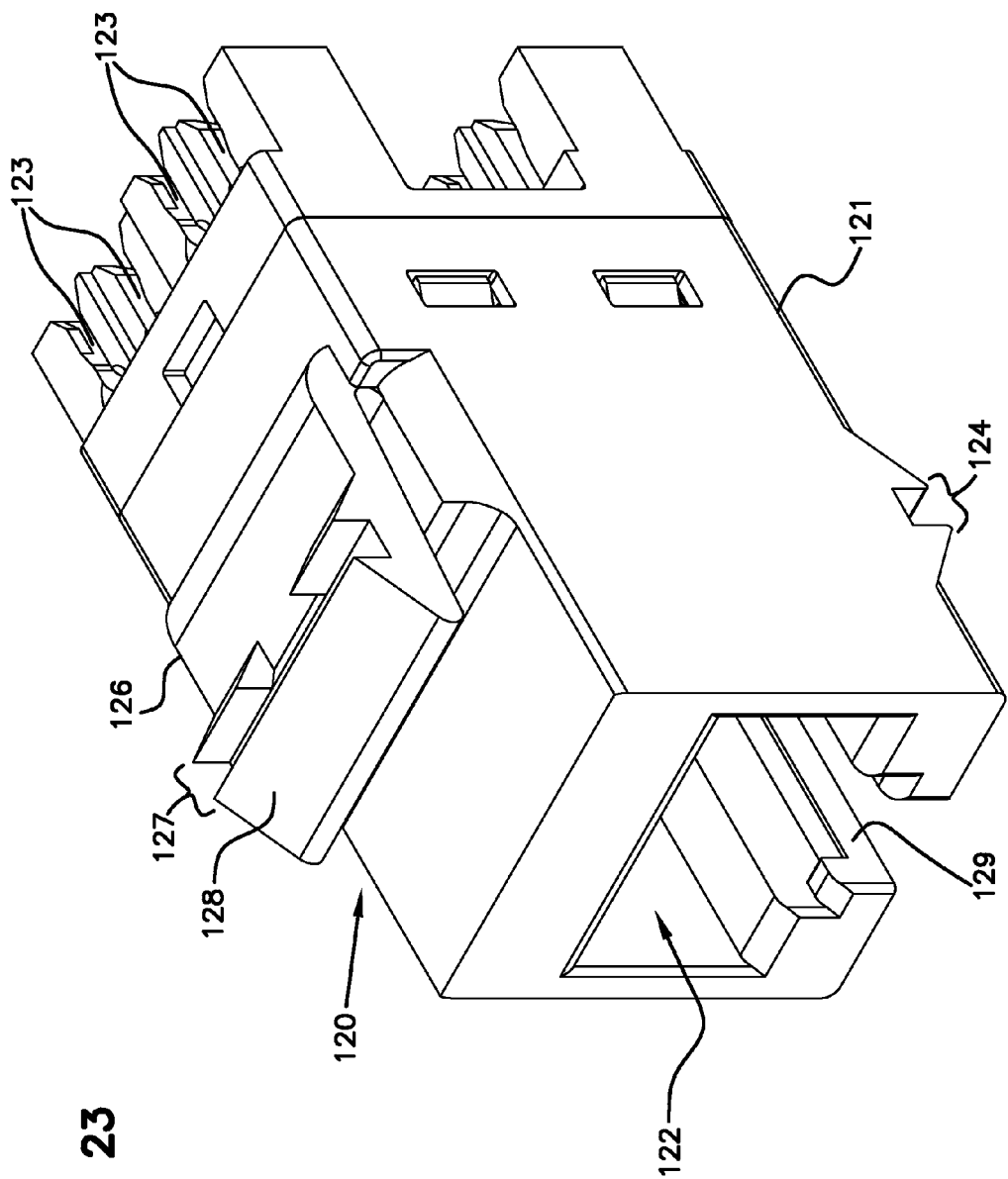
FIG. 23 is a front top perspective view of an example jack module of the faceplate assembly of FIG. 6.
Figure 24:
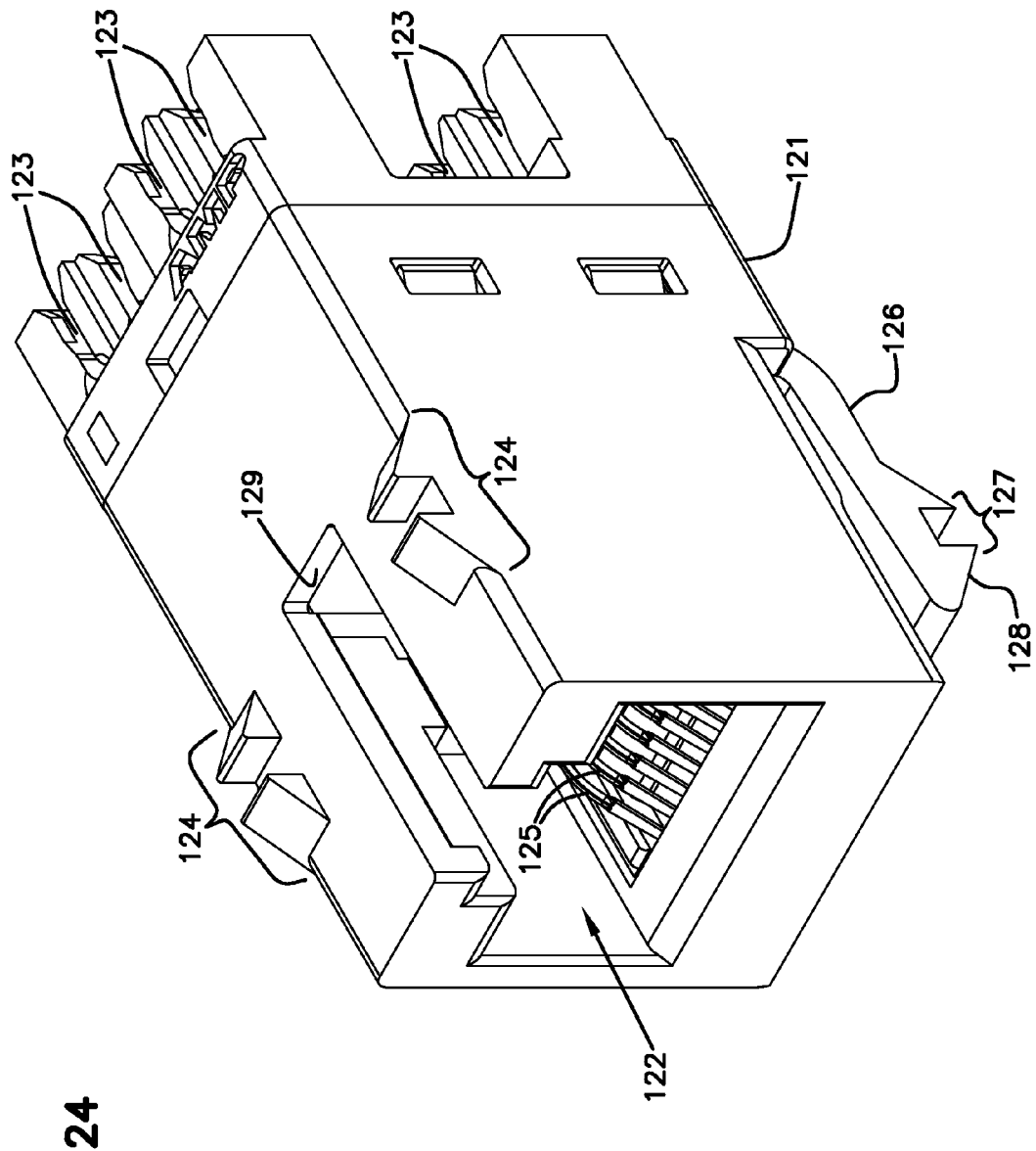
FIG. 24 is a front, bottom perspective view of the example jack module of FIG. 23.

FIGS. 23 and 24 illustrate one example implementation of a jack module 120 suitable for use in the faceplate assembly 100 disclosed herein. The jack module 120 includes a jack body 121 that defines a socket or port 122 at one end thereof. The primary contacts 125 are disposed within the jack body 121. At least portions of the primary contacts 125 are accessible through the port 122. The primary contacts 125 flex away from the port 122 when a plug connector (e.g., plug 402 of FIGS. 3 and 4) is inserted into the port 122. The main signal contacts 412 of the plug 402 engage the primary contacts 125 when the plug 402 is held at the port 122. A slot 129 extends from the port along one side of the jack body 121 (see FIG. 24).

Rear contacts 123 are coupled to the primary contacts 125. The rear contacts 123 are accessible from another end of the jack body 121. In the example shown, the rear contacts 123 include insulation displacement contacts. In other implementations, however, the rear contacts 123 may include any other type of electrical connection. In the example shown, the rear contacts 123 extend outwardly from a rear of the jack body 121 in-line with the port 122. In other implementations, the rear contacts 123 may extend outwardly from any side of the jack body 121 and need not be in-line with the port 122. In the example shown, the rear contacts 123 are disposed in a separate housing part that latches to a first housing part that holds the primary contacts 125. In other implementations, the jack body 121 may be formed as a monolithic part.

The jack body 121 is configured to attach to the faceplate member 110. In some implementations, the jack body 121 includes latching lugs 124 at a first side of the body 121 and a latching arm 126 at a second side of the body 121. The latching lugs 124 are fixed relative to the body 121 and the latching arm 126 is flexible relative to the body 121. In the example shown, the latching lugs 124 include two ramped surfaces that define a channel therebetween. A portion 113a (FIG. 15) of the support frame 113 of the faceplate member 110 fits in the channel (e.g., see FIGS. 8 and 10). In some implementations, the latching lugs 124 extend across a width of the jack body 121. In other implementations, however, multiple latching lugs 124 are arranged on the jack body 121. For example, in FIG. 24, two latching lugs 124 are spaced apart so as to be disposed at opposite sides of the jack body 121.

The latching arm 126 also includes latching lugs 127 that are fixed relative to the latching arm 126. The latching lugs 127 include two ramped surfaces that define a channel therebetween. Another portion of the support frame 113 is configured to fit within the channel (e.g., see FIGS. 8 and 10). The latching arm 126 also defines a ramped surface 128 that facilitates inserting a front portion of the jack body 121 through one of the openings 112 defined in the faceplate member 110. In the example shown, the ramped surface 128 defines one of the two ramped surfaces of the latching lugs 127. In some implementations, both ramped surfaces of the latching lugs 127 extend across a width of the jack body 121. In the example shown in FIG. 23, however, one of the ramped surfaces includes a break or separation between two adjacent ramps.

To mount the jack module 120 at the faceplate member 110, a front of the jack body 121 is inserted through the support frame 113 and through one of the openings 112 from the rear 102 of the faceplate member 110. As the front is being inserted, the support frame 113 deflects the latching arm 126 towards the jack body 121. The jack body 121 is angled or raised upwardly so that a front ramped surface of the latching lugs 124 clears the support frame 113 and the portion 113a of the support frame 113 is allowed to enter the channel defined by the latching lugs 124. When the latching lugs 124 are secured to the frame 113, the jack body 121 is angled or further inserted through the opening 121 so that the latching arm 126 biases the latching lugs 127 into engagement with the other portion of the frame 113, thereby securing the jack body 121 to the frame 113.

The secondary contacts 145 of the media reading interfaces 140 extend into the jack modules 120 through the slots 129. In some implementations, the circuit board assembly 130 is mounted to the faceplate member 110 before the jack modules 120. Since the slots 129 extend to the port 122, the secondary contacts 145 slide through the ports 122 and through the slots 129 as the jack modules 120 are mounted to the faceplate member 110.

Figure 6:
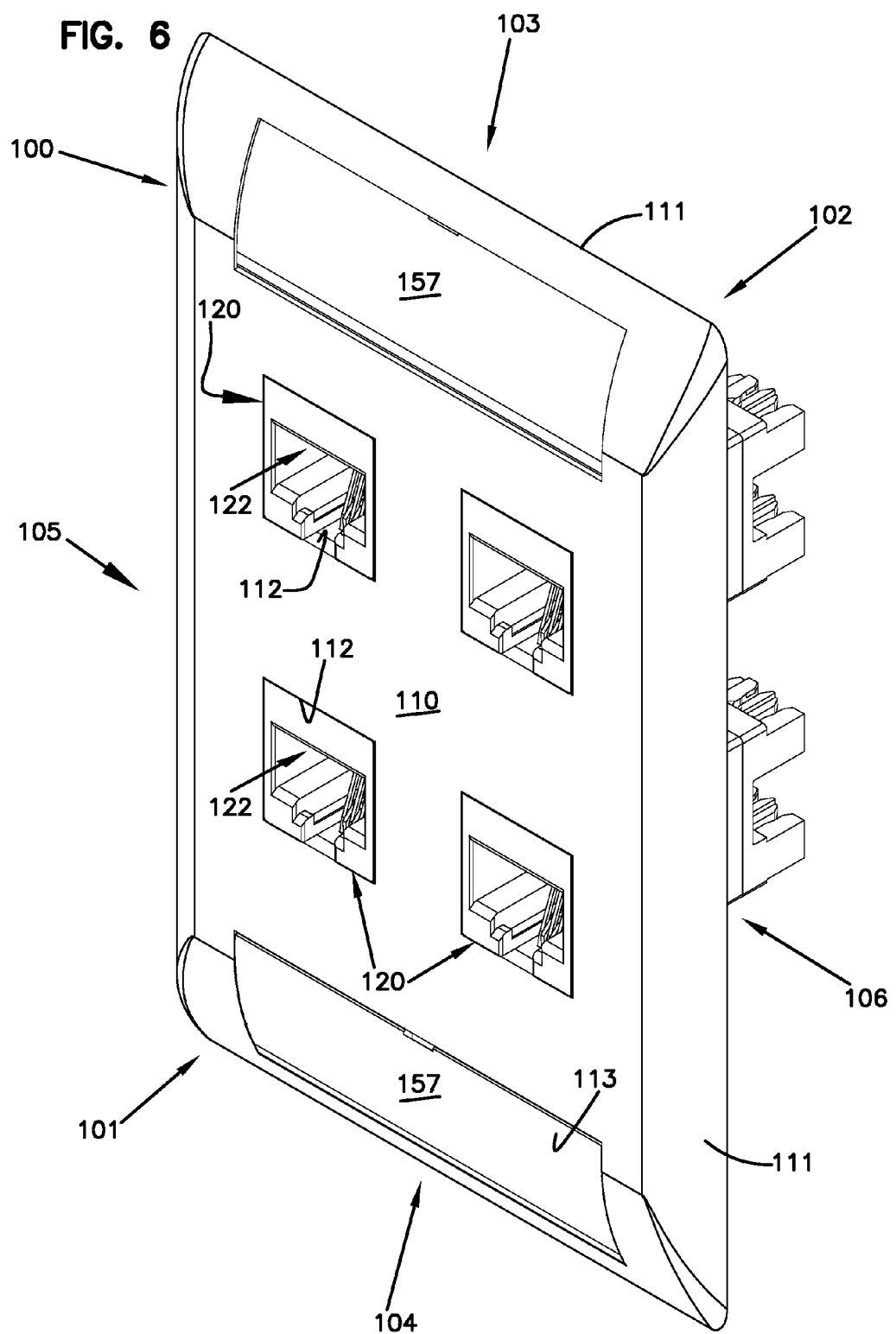
FIG. 6 is a front perspective view of the example faceplate assembly of FIG. 5 with the components assembled together.
Figure 7:
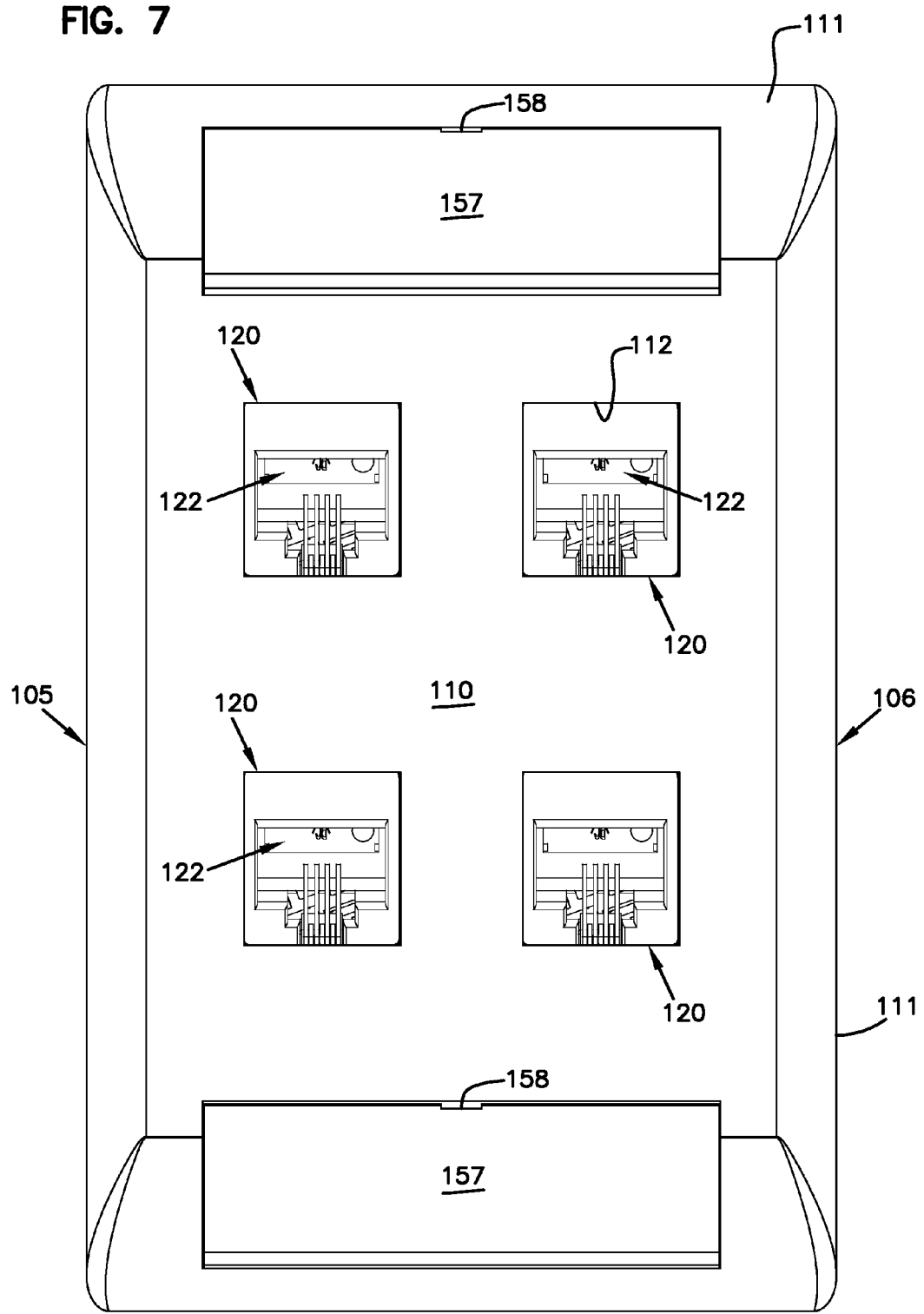
FIG. 7 is a front elevational view of the faceplate assembly of FIG. 6.
Figure 8:
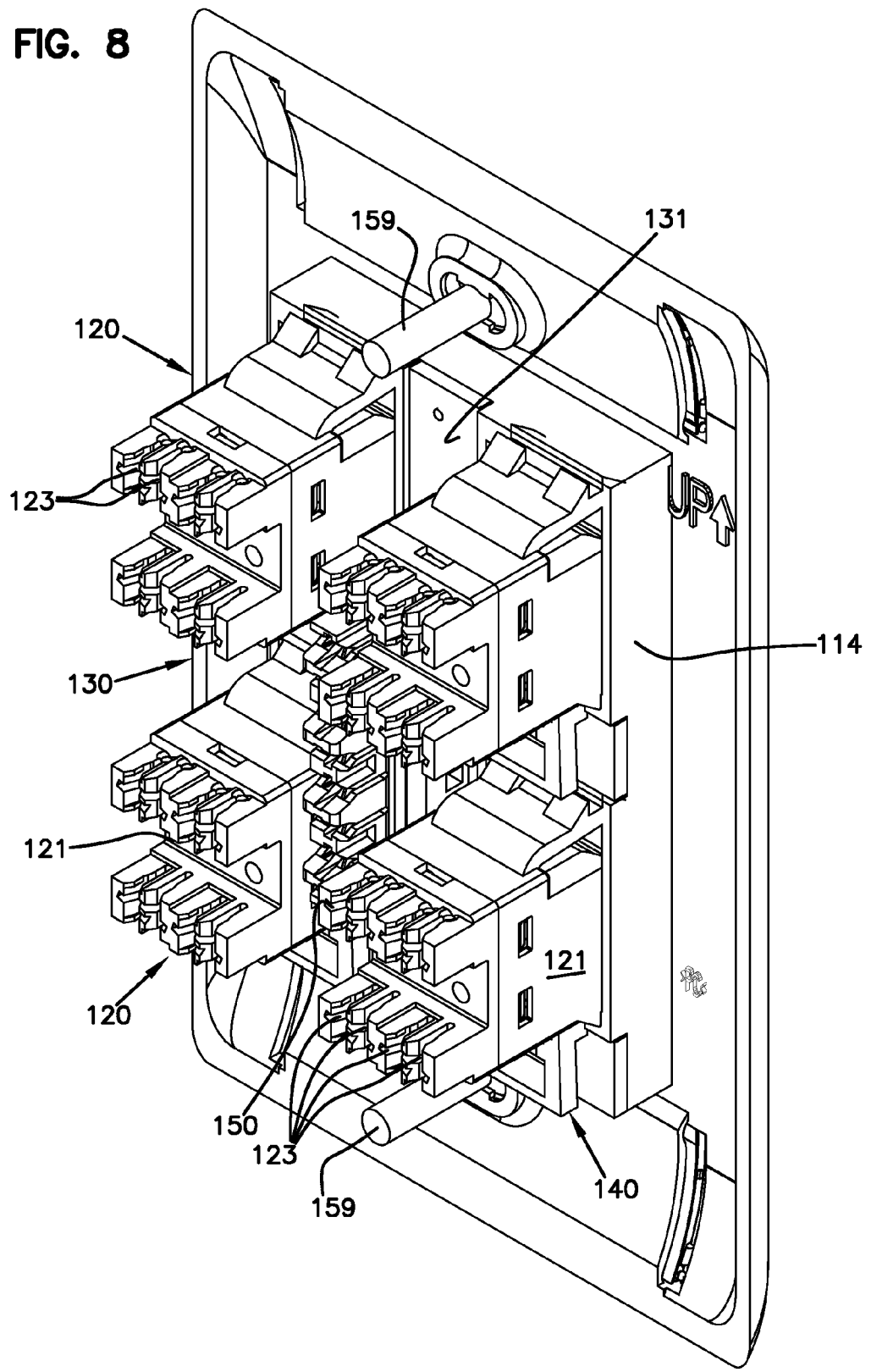
FIG. 8 is a rear perspective view of the faceplate assembly of FIG. 6.
Figure 9:
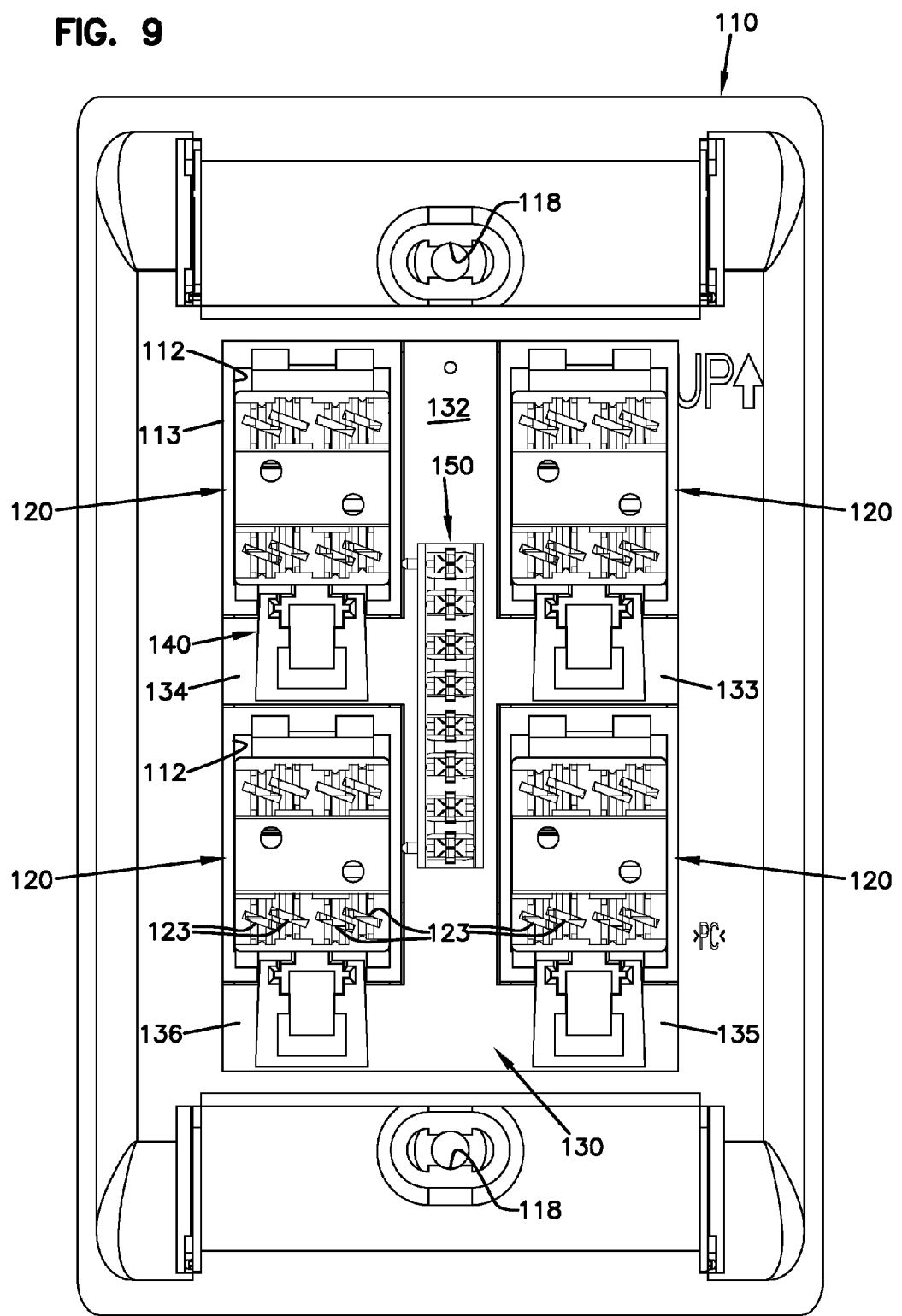
FIG. 9 is a rear elevational view of the faceplate assembly of FIG. 6.
Figure 10:
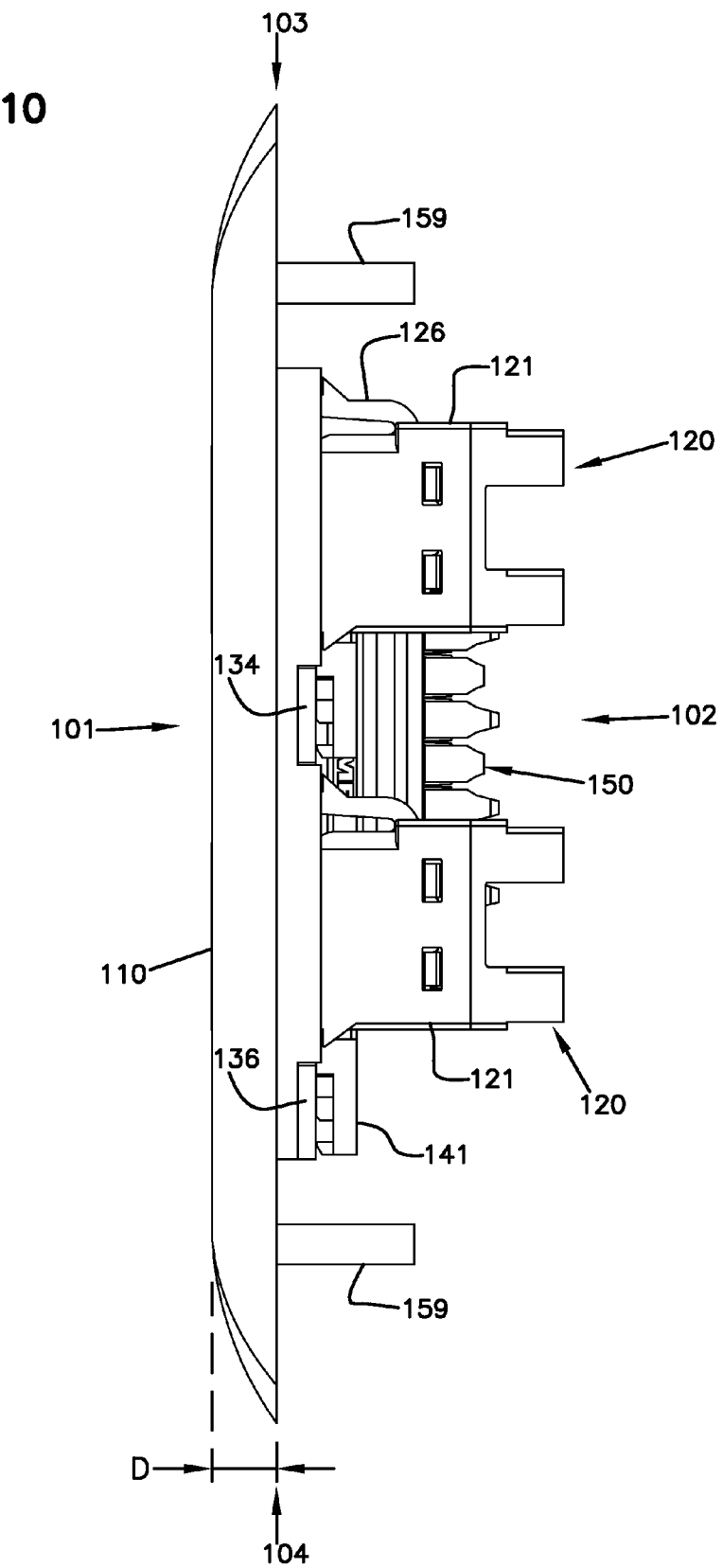
FIG. 10 is a side elevational view of the faceplate assembly of FIG. 6.
Figure 14:
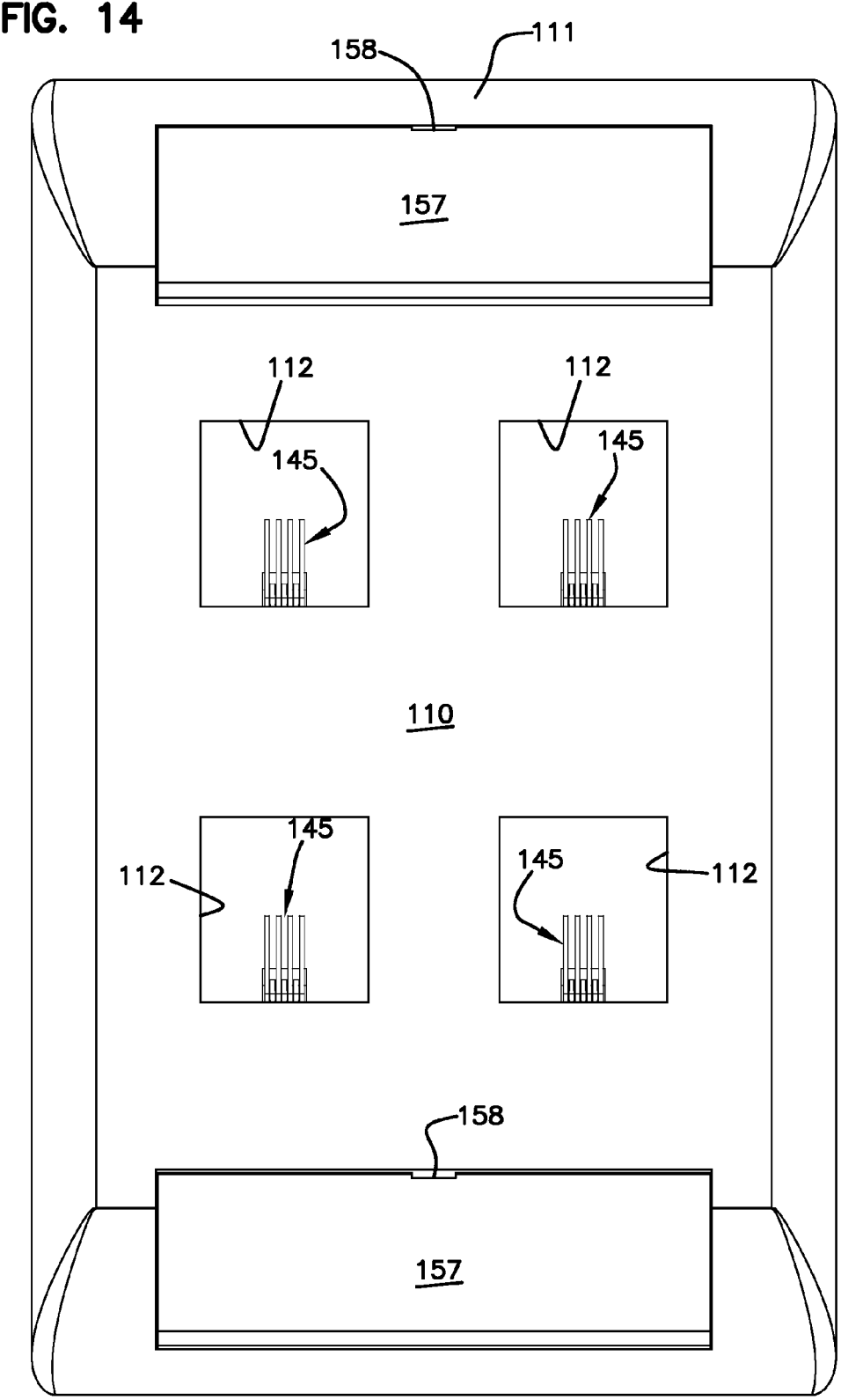
FIG. 14 is a front elevational view of the faceplate member and circuit board assembly of FIG. 13.

In some implementations, the front faces of the jack bodies 121 are flush with the front surface of the faceplate member 110 when the jack modules 120 are fully inserted (e.g., see FIGS. 6 and 10). In other implementations, the front faces of the jack bodies 121 may be recessed rearwardly relative to the front surface of the faceplate member 110 or protruding outwardly from the front surface of the faceplate member 110.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A faceplate assembly comprising:
   (a) a faceplate member having a front and a rear and defining at least one opening extending between the front and the rear;
   (b) at least one jack module mounted in the opening of the faceplate member, the jack module defining a port accessible from the front of the faceplate member, the jack module including a plurality of primary contacts that are configured to attach to conductors that are accessible from the rear of the faceplate member; and
   (c) a printed circuit board assembly mounted to the rear of the faceplate member, the printed circuit board assembly including:
      a printed circuit board;
      a first set of secondary contacts that are electrically connected to the printed circuit board, the secondary contacts of the first set extending into the jack module, the secondary contacts of the first set being isolated from the primary contacts of the jack module, and
      a network connector that is electrically connected to the secondary contacts of the first set via the printed circuit board.

2. The faceplate assembly of claim 1, wherein the faceplate member defines at least one additional opening, and wherein the printed circuit board assembly includes at least a second set of secondary contacts that are electrically connected to the printed circuit board.

3. The faceplate assembly of claim 2, further comprising at least one additional jack module mounted to the additional opening, the additional jack module defining a port accessible from the front of the faceplate member, the additional jack module including a plurality of primary contacts, the secondary contacts of the second set of the printed circuit board assembly extending into the additional jack module, and the secondary contacts of the second set being isolated from the primary contacts of the additional jack module.

4. The faceplate assembly of claim 2, wherein the network connector is electrically connected to the secondary contacts of the second set via the printed circuit board.

5. The faceplate assembly of claim 1, wherein the jack module is mounted flush to the front of the faceplate member.

6. The faceplate assembly of claim 1, wherein the first set of secondary contacts includes three secondary contacts.

7. The faceplate assembly of claim 1, wherein the first set of secondary contacts includes four secondary contacts.

8. The faceplate assembly of claim 1, wherein the network connector has a first line for power, a second line for ground, and a data line for each opening defined in the faceplate member.

9. The faceplate assembly of claim 8, wherein the network connector includes a D-block.

10. The faceplate assembly of claim 1, wherein the printed circuit board assembly includes a memory storage device that stores a unique ID associated with the faceplate assembly.

* * * * *